US012206157B2

(12) United States Patent
Liao

(10) Patent No.: US 12,206,157 B2
(45) **Date of Patent: *Jan. 21, 2025**

(54) SEMICONDUCTOR PACKAGE WITH ANTENNA AND METHOD OF FORMING THE SAME

(71) Applicant: Taiwan Semiconductor Manufacturing Company, Ltd., Hsinchu (TW)

(72) Inventor: Wen-Shiang Liao, Miaoli County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,019

(22) Filed: Jun. 18, 2023

(65) Prior Publication Data

US 2023/0335884 A1 Oct. 19, 2023

Related U.S. Application Data

(63) Continuation of application No. 17/185,850, filed on Feb. 25, 2021, now Pat. No. 11,721,883.

(51) Int. Cl.

| | |
|---|---|
| ***H01Q 1/22*** | (2006.01) |
| ***H01Q 1/40*** | (2006.01) |
| ***H01Q 1/48*** | (2006.01) |
| ***H01Q 9/04*** | (2006.01) |

(52) U.S. Cl.

CPC ............. *H01Q 1/2283* (2013.01); *H01Q 1/40* (2013.01); *H01Q 1/48* (2013.01); *H01Q 9/0407* (2013.01)

(58) Field of Classification Search

CPC .......... H01Q 1/2283; H01Q 1/40; H01Q 1/48; H01Q 9/0407

See application file for complete search history.

(56) References Cited

U.S. PATENT DOCUMENTS

| | | | | |
|---|---|---|---|---|
| 2012/0105182 | A1* | 5/2012 | Bohn | H01Q 21/0093 335/296 |
| 2018/0233465 | A1* | 8/2018 | Spella | H01L 23/49827 |
| 2019/0035749 | A1* | 1/2019 | Dalmia | H01Q 1/2283 |
| 2019/0103339 | A1* | 4/2019 | Goktepeli | H01L 28/40 |
| 2019/0103680 | A1* | 4/2019 | Liao | H01Q 21/065 |
| 2019/0131196 | A1* | 5/2019 | Cook | H01L 23/28 |
| 2019/0181104 | A1* | 6/2019 | Chen | H01Q 21/065 |
| 2019/0326232 | A1* | 10/2019 | Lin | H01Q 1/2283 |
| 2019/0333882 | A1* | 10/2019 | Kamgaing | H01Q 9/0414 |
| 2020/0098709 | A1* | 3/2020 | Lin | H01L 23/3128 |
| 2020/0373259 | A1* | 11/2020 | Koller | H01L 21/4853 |

* cited by examiner

*Primary Examiner* — Thien M Le

(74) *Attorney, Agent, or Firm* — JCIPRNET

(57) ABSTRACT

A semiconductor package includes a semiconductor die, an encapsulation layer and at least one antenna structure. The encapsulation layer laterally encapsulates the semiconductor die. The at least one antenna structure is embedded in the encapsulation layer aside the semiconductor die. The at least one antenna structure includes a dielectric bulk, and a dielectric constant of the dielectric bulk is higher than a dielectric constant of the encapsulation layer.

20 Claims, 25 Drawing Sheets

SEMICONDUCTOR PACKAGE WITH ANTENNA AND METHOD OF FORMING THE SAME

CROSS-REFERENCE TO RELATED APPLICATION

This application is a continuation application of and claims the priority benefit of a prior application Ser. No. 17/185,850 filed on Feb. 25, 2021. The entirety of the above-mentioned patent application is hereby incorporated by reference herein and made a part of this specification.

BACKGROUND

In modern semiconductor devices and systems, integration and miniaturization of components have progressed at an increasingly rapid pace. In wireless applications, one of the growing challenges encountered by the integration process is the disposition of radio frequency devices or antennas. Conventional antennas associated with integrated circuits are usually designed with limited performance and capability due to the competing objective of size reduction. Thus, an improved integrated antenna structure is desired.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
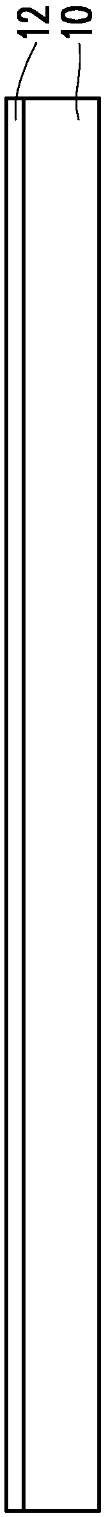
FIG. 1 to FIG. 19 illustrate schematic cross-sectional views of a method of forming semiconductor package in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a second feature over or on a first feature in the description that follows may include embodiments in which the second and first features are formed in direct contact, and may also include embodiments in which additional features may be formed between the second and first features, such that the second and first features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath", "below", "lower", "on", "above", "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In addition, terms, such as "first," "second," "third," "fourth," and the like, may be used herein for ease of description to describe similar or different element(s) or feature(s) as illustrated in the figures, and may be used interchangeably depending over the order of the presence or the contexts of the description.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

FIG. 1 to FIG. 19 illustrate schematic cross-sectional views of a method of forming semiconductor package in accordance with some embodiments of the disclosure. It is understood that the disclosure is not limited by the method described below. Additional operations can be provided before, during, and/or after the method and some of the operations described below can be replaced or eliminated, for additional embodiments of the methods.

Although FIG. 1 to FIG. 21 are described in relation to a method, it is appreciated that the structures disclosed in FIG. 1 to FIG. 21 are not limited to such a method, but instead may stand alone as structures independent of the method.

Referring to FIG. 1, a carrier 10 is provided, and a debonding layer 12 is deposited on the carrier 10. The carrier 10 can be a blank glass carrier, a blank ceramic carrier, or the like. The debonding layer 12 can be formed of an adhesive such as a ultra-violet (UV) glue, Light-to-Heat Conversion (LTHC) glue, or the like, although other types of adhesives may be used.

Figure 2:
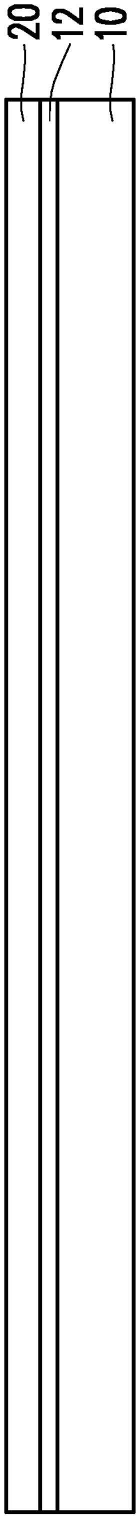

Referring to FIG. 2, a buffer layer 20 is formed over the debonding layer 12. The buffer 20 is referred to a "back-side buffer layer" in some examples. The buffer layer 20 includes a polymer material, a dielectric material or an insulating material. The polymer material includes, for example but not limited to, polybenzoxazole (PBO), polyimide (PI) or benzocyclobutene (BCB), Ajinomoto buildup film (ABF), solder resist (SR) film, or the like. The buffer layer 20 is a planar layer having a uniform thickness, and the thickness ranges from about 2 μm to about 40 μm, for example. In some embodiments, the method of forming the buffer layer 20 includes spin-coating a polymer material on the debonding layer 12, and curing and hardening the polymer material. In some embodiments, the buffer layer 20 acts as the final protective insulator for the finished semiconductor package.

Referring to FIGS. 3-6, emitter structures 40 and ground structures 50 are formed over the buffer layer 20. In some embodiments, a back-side redistribution layer structure (not shown) is optionally formed on the back-side buffer layer 20, and the emitter structures 40 and the ground structures 50 are formed over and electrically to the back-side redistribution layer structure.

Figure 3:
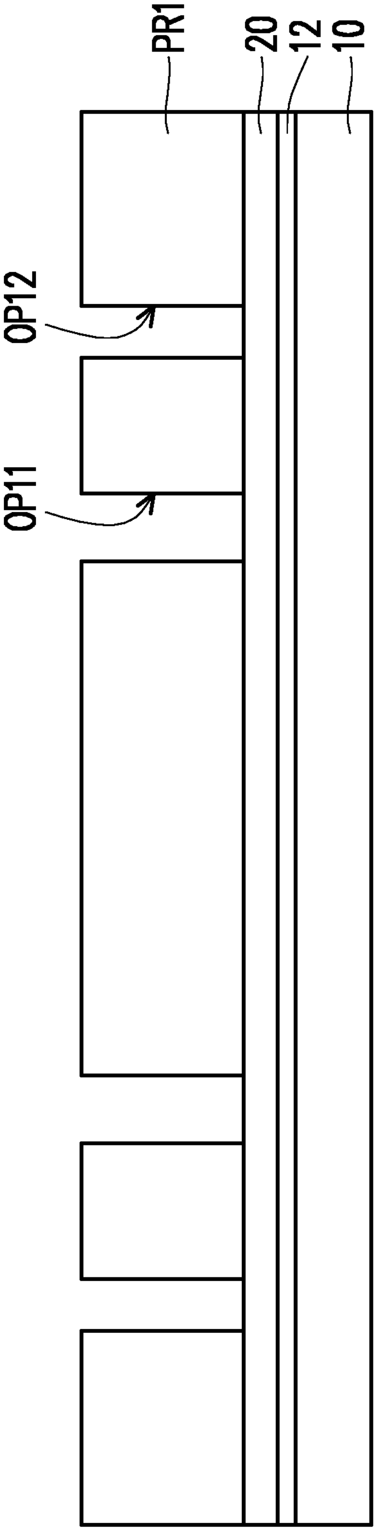

As shown in FIG. 3, a photoresist layer PR1 is applied over the buffer layer 20. The photoresist layer PR1 is then patterned to form openings OP11 and OP12 in the photoresist layer PR1. Such patterning is done by a photolithography process. The openings OP11 and OP12 expose portions of the buffer layer 20. The openings OP11 and OP12 are subsequently filled with metals to form the emitter structures 40 and the ground structures 50. Thus, the shapes of the openings OP11 and OP12 will depend on the shapes of the subsequently formed emitter structures 40 and the ground structures 50. For example, if openings OP11 are intended for forming emitter structures 40, each opening OP11 can include multiple through dielectric via (TIV) holes connected to each other, a single wall-like trench or a plate-like slot. For example, if openings OP12 are intended for forming ground structures 50, each opening OP12 can includes multiple TIV holes separated from each other. The TIV holes can be cylindrical in form or pillar-like holes having the same or different cross-sectional shapes. In some embodiments, the openings OP11 and OP12 have a height of about 120-300 μm. In some embodiments, the openings OP11 are wider than openings OP12 in a cross-sectional view, as shown in FIG. 3. However, the disclosure is not limited to. In other embodiments, the openings OP11 can be as wide as or narrower than openings OP12 upon the process requirements. In some embodiments, the distance between the two adjacent openings OP11 and OP12 ranges from 50 μm to 5 mm.

Figure 4:
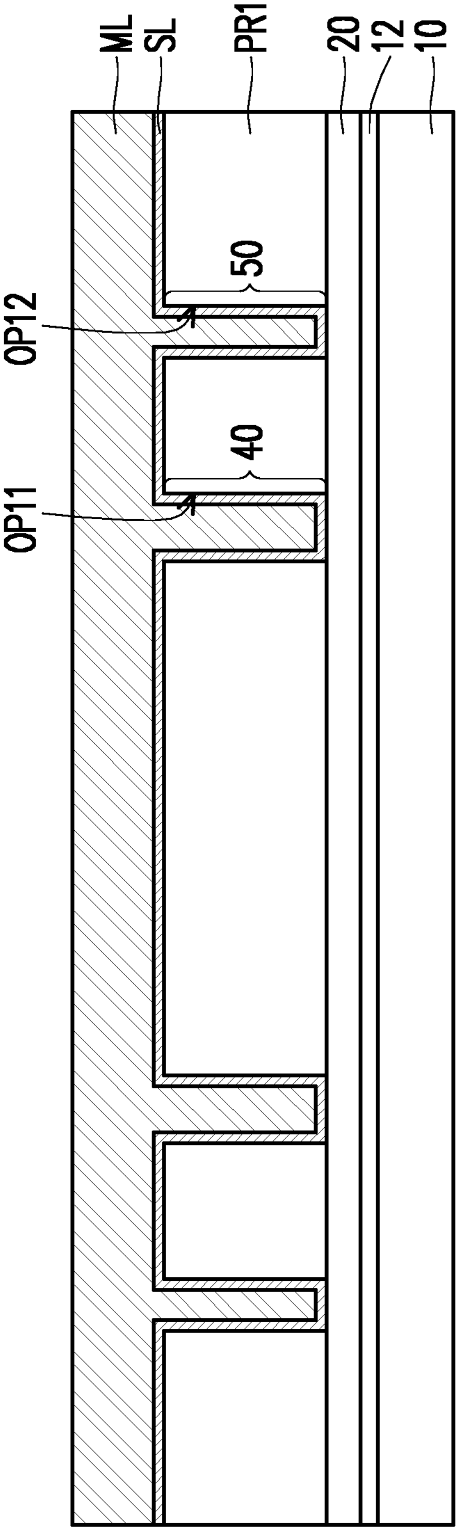

Referring to FIG. 4, a seed layer SL is formed on the structure of FIG. 3 in preparation for electroplating deposition of the emitter structures 40 and the ground structures 50. In some embodiments, the seed layer SL includes a Ti/Cu layer of 300 Å/5000 Å thick. The seed layer SL covers the surfaces of the photoresist layer PR1 and the buffer layer 20 exposed by the openings OP11 and OP12.

Thereafter, metal features such as the emitter structures 40 and the ground structures 50 are formed by filling the openings OP11 and OP12 in the photoresist layer PR1 with a metal layer ML by plating, which may be electro plating or electro-less plating, on the seed layer SL. In some embodiments, the metal layer ML includes Cu, Al, W, Ni, or an alloy thereof.

Figure 5:
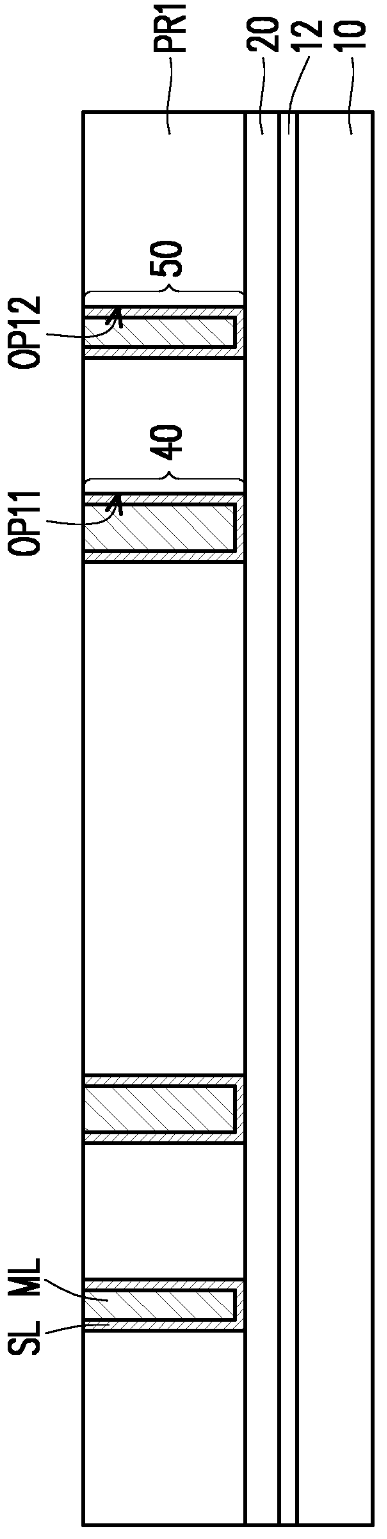

Referring to FIG. 5, the excess portions of the seed layer SL and the metal layer ML outside of the openings OP11 and OP12 of the photoresist layer PR1 are removed. In some embodiments, the removing operation includes a suitable removing process such as chemical mechanical polishing (CMP).

Figure 6:
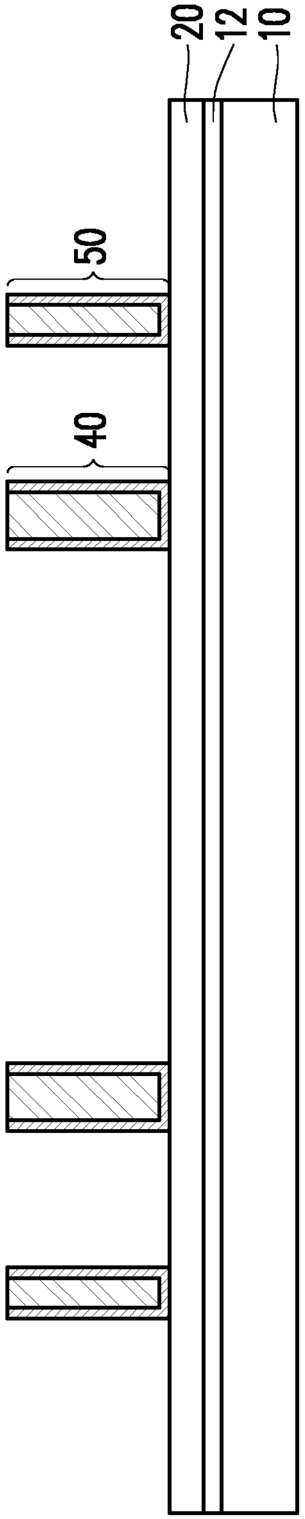

Thereafter, the photoresist layer PR1 is removed by a stripping process, and the resulting structure is shown in FIG. 6. The openings OP11 and OP12 in the photoresist layer PR1 now form the emitter structures 40 and the ground structures 50. The emitter structures 40 are referred to as "RF emitters", "RF signal structures", "emitter plates", "emitter planes" or "TIV walls" in some examples. The ground structures 50 are referred to as "RF grounding structures", "ground planes" or "TIV grating structures" in some examples.

Figure 7:
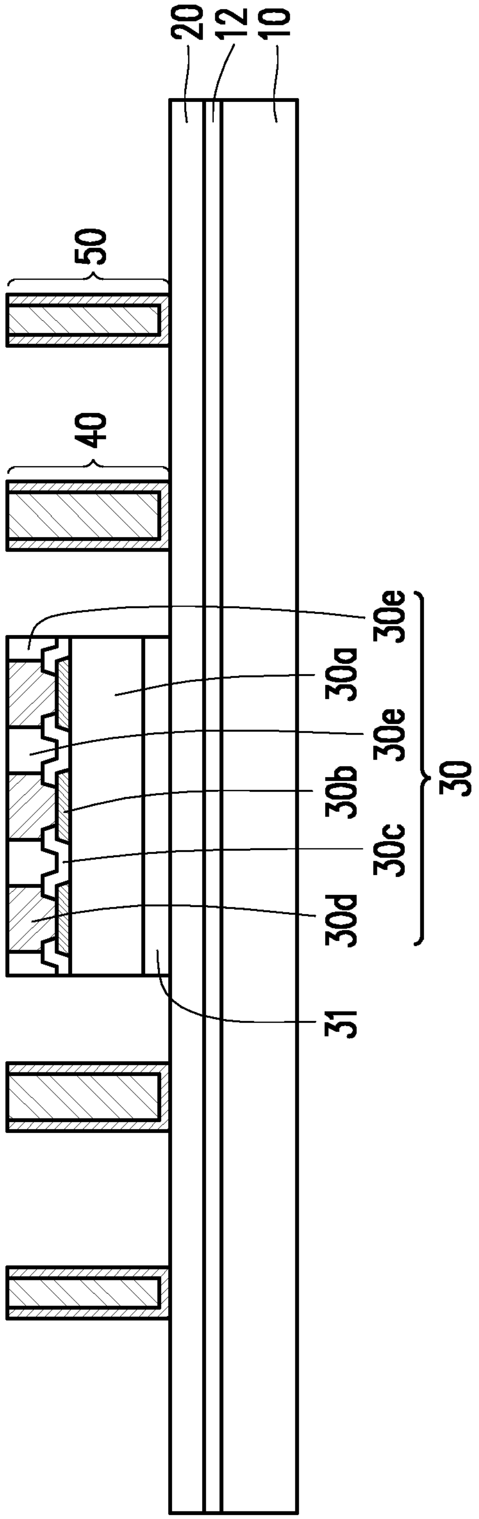

FIG. 7 illustrates the placement of the semiconductor die 30 on the buffer layer 20. In some embodiment, the semiconductor die 30 can be adhered to the buffer layer 20 using a die attach film (DAF) 31. In some embodiments, the semiconductor die 30 includes an application-specific integrated circuit (ASIC) chip, an analog chip, a wireless and radio frequency chip, a voltage regulator chip, a logic chip, a memory chip, a sensor chip, an imaging chip, a MEMS chip, or any other suitable type of chip. In some embodiments, the semiconductor die 30 includes a radio-frequency integrated circuit (RF IC) chip or the like.

In some embodiments, the semiconductor die 30 includes a substrate 30*a*, pads 30*b* over the substrate 30*a*, a passivation layer 30*c* over the substrate 30*a*, metal pillars or connectors 30*d* over the passivation layer 30*c* and electrically connected to the pads 30*b*, and a protection layer 30*e* over the passivation layer 30*c* and aside the connectors 30*d*. The substrate 30*a* may include bulk silicon, doped or undoped, or an active layer of a semiconductor-on-insulator (SOI) substrate. The substrate 30*a* may have a device layer that includes a gate, source/drain regions, an interconnection structure, etc. The pads 30*b* may be electrically connected to the device layer and may include aluminum. The passivation layer 30*c* includes a dielectric material such as silicon oxide, silicon nitride or silicon oxynitirde, a polymer material such as polybenzoxazole (PBO), polyimide (PI) or benzocyclobutene (BCB), or the like. The connectors 30*d* are formed through the passivation layer 30*c* and electrically connected to underlying pads 30*b* or the device layer. In some embodiments, the connectors 30*d* are formed as the top portions of the semiconductor die 30. The connectors 30*d* protrude from the remaining portions or lower portions of the semiconductor die 30. Throughout the description, the sides of the semiconductor die 30 with the connectors 30*d* are referred to as front sides. The connectors 30*d* may include Cu, W, Ni, Sn, Ti, Au, an alloy or a combination thereof, and are formed with an electroplating process and/or a ball drop process. The protection layer 30*e* includes a dielectric material such as silicon oxide, silicon nitride or silicon oxynitirde, a polymer material such as polybenzoxazole (PBO), polyimide (PI) or benzocyclobutene (BCB), or the like. The protection layer 30*e* is formed at the top surface of the semiconductor die 30 filling the spaces between the connectors 30*d*, with the connectors 30*d* having at least their lower portions in the protection layer 30*e*. In some embodiments, the top surfaces of the connectors 30*d* can be level with the top surface of the protection layer 30*e*, as shown in FIG. 7. The passivation layer 30*c* may include a material different from that of the protection layer 30*e*.

Figure 8:
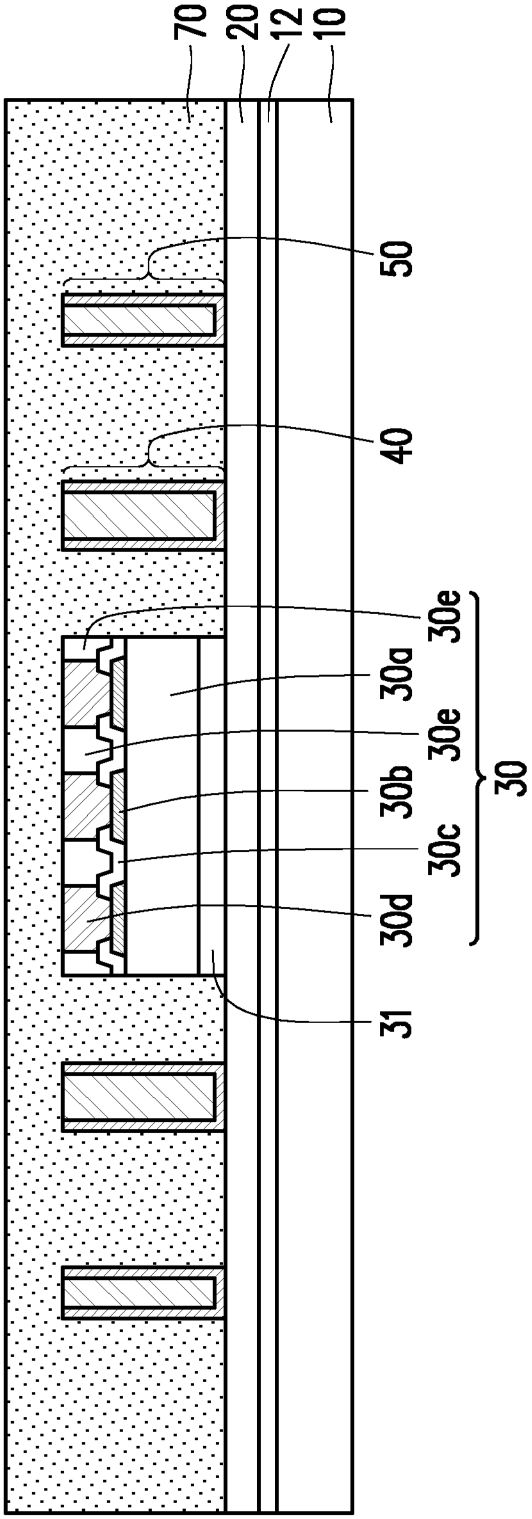

Referring to FIG. 8, an encapsulation layer 70 is applied over the semiconductor die 30, the emitter structures 40 and the ground structures 50. In some embodiments, the encapsulation layer 70 fills the gaps between the semiconductor die 30, the emitter structures 40 and the ground structures 50, and is in contact with the exposed portions of the buffer layer 20. The encapsulation layer 70 may include a molding compound, a molding underfill, an epoxy, or a resin. The encapsulation layer 70 includes liquid epoxy, such as liquid epoxy containing fine granular silica, liquid glass ($SiO_2$) (spin on glass) or ceramics. In some embodiments, the encapsulation layer 70 can be applied as a coating, similar to photoresists, and then low temperature (about 180-200° C.) cured and hardened. In some embodiments, the encapsulation layer 70 has a dielectric constant (k) ranges from 2.8 to 3.0. In some embodiments, the encapsulation layer 70 has a dielectric constant (k) less than 3.5. The encapsulation layer 70 is provided in sufficient amount to embed the semiconductor die 30, the emitter structures 40 and the ground structures 50. At this stage, the top surface of the encapsulation layer 70 is higher than the top surfaces of the connectors 30*d* on the semiconductor die 30, the emitter structures 40 and the ground structures 50.

Figure 9:
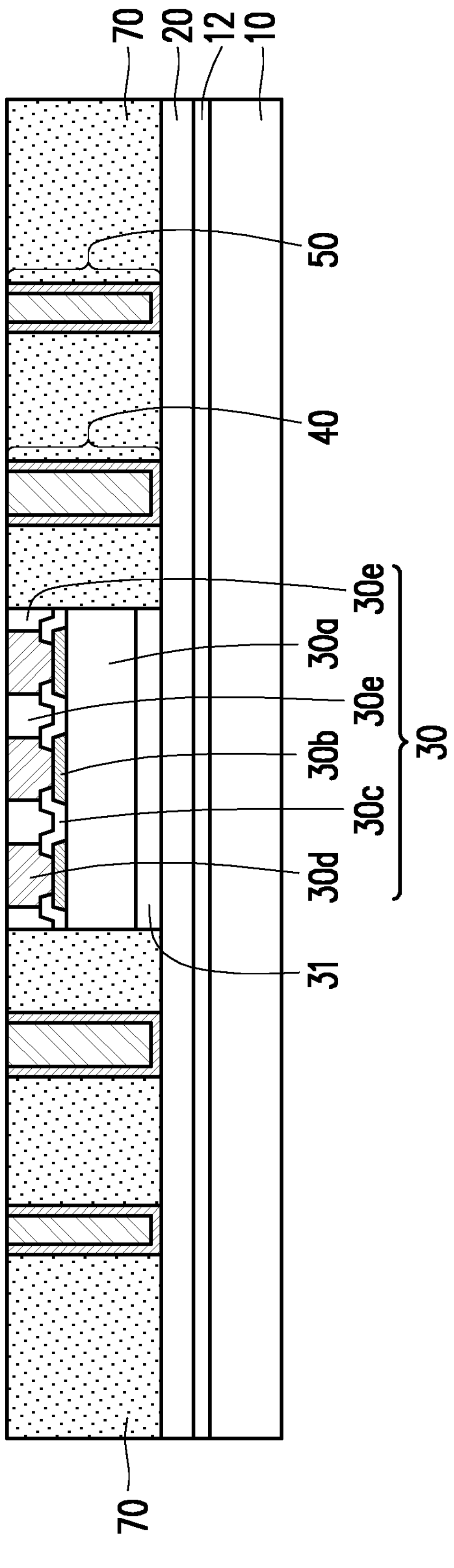

Referring to FIG. 9, a removing operation is performed to thin the encapsulation layer 70 until the tops of the connectors 30*d*, the emitter structures 40 and the ground structures 50 are exposed. The removing operation can be accomplished by grinding (e.g., CMP), although other types of removing techniques may be used. The grinding leaves the top ends of the metal features such as the connectors 30*d*, the emitter structures 40 and the ground structures 50, to be substantially level or coplanar with each other. Some metal residues such as metal particles may remain after the grinding operation. Accordingly, after the grinding operation, a cleaning may be performed, for example, through a wet etching, to remove the metal residues. One emitter structure 40 and the adjacent ground structure 50 are configured to define sidewalls of an antenna cavity, which will be described in FIG. 11.

Figure 10:
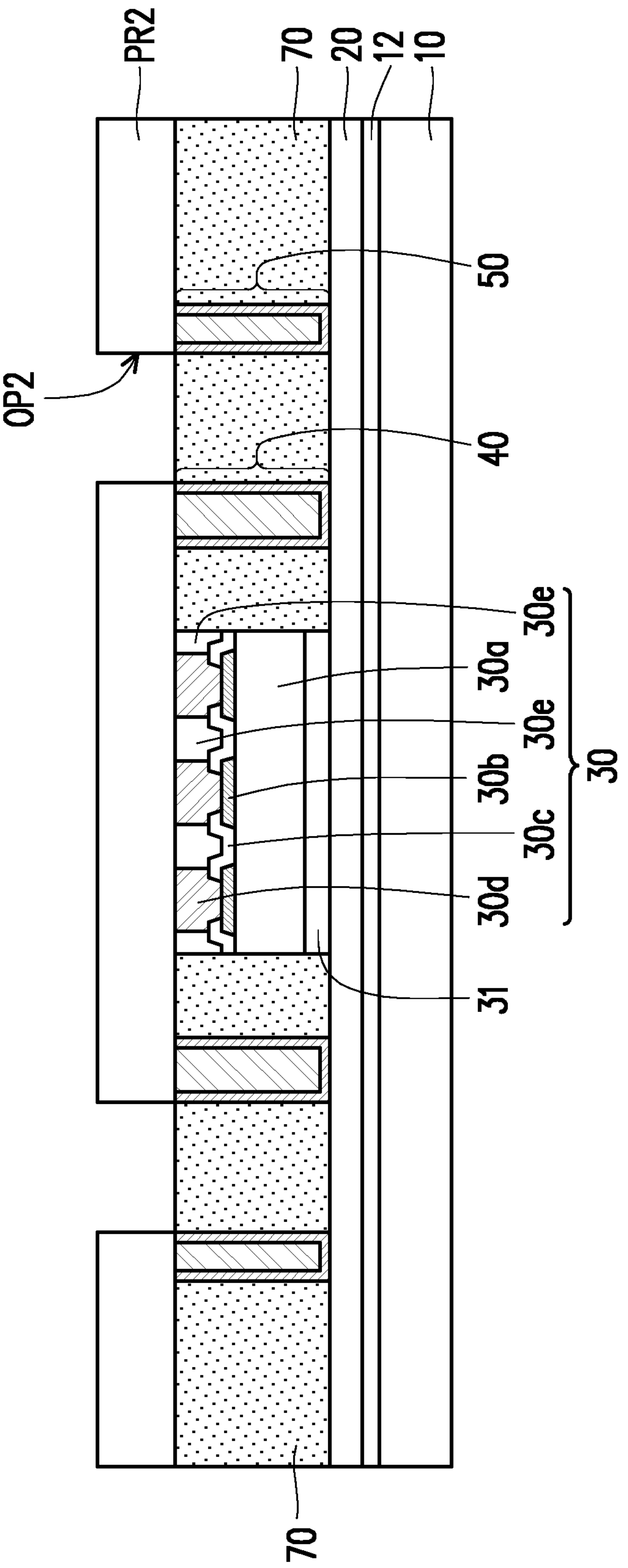

Referring to FIG. 10, a photoresist layer PR2 is applied over the encapsulation layer 70. Then, the photoresist layer PR1 is patterned to form openings OP2 in the photoresist layer PR2. Such patterning is done by a photolithography process. The openings OP2 expose portions of the encapsulation layer 70. The openings OP2 are configured to define the antenna cavities. In some embodiments, the openings OP2 have a height of about 120 μm to 300 μm and a width of about 50 μm to 50 mm.

Figure 11:
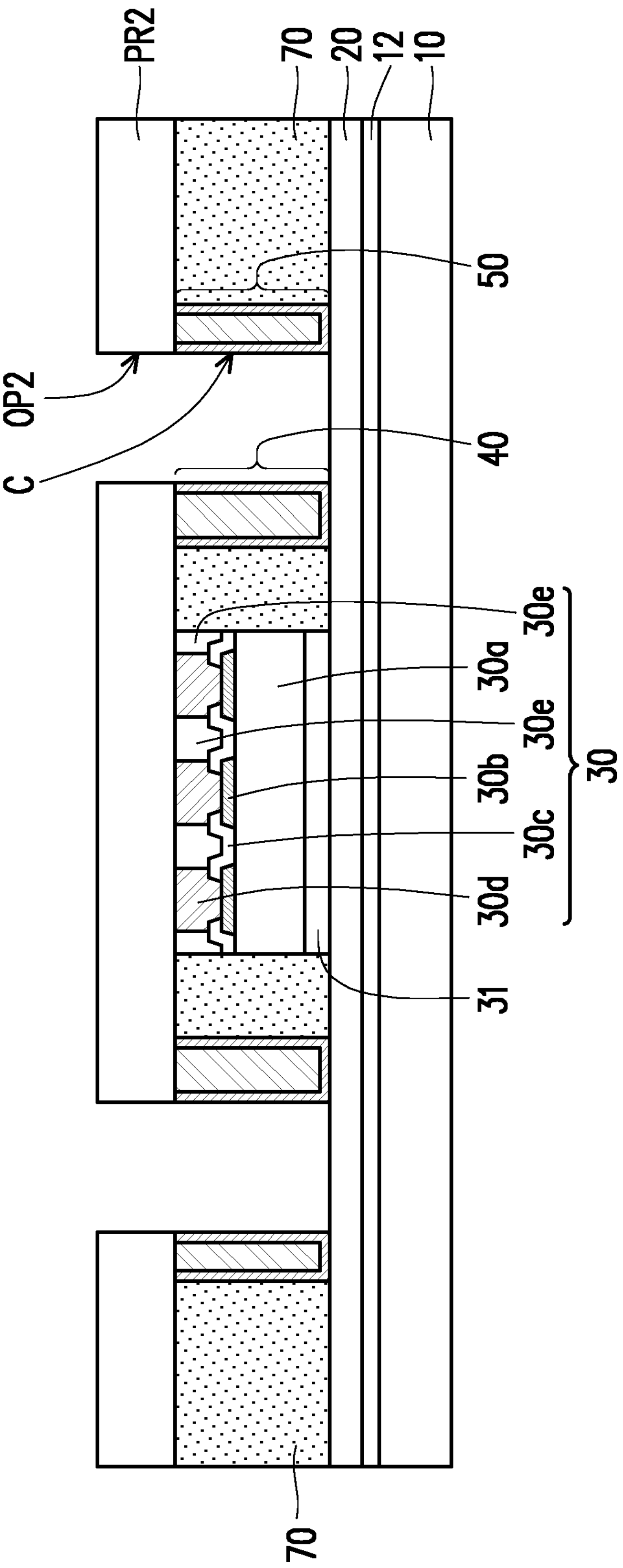

Referring to FIG. 11, portions of the encapsulation layer 70 exposed by the openings OP2 of the photoresist layer PR2 are removed by a suitable process, such as a wet etching process. Accordingly, multiple antenna cavities C are formed in the encapsulation layer 70 and expose portions of the buffer layer 20. In some embodiments, the encapsulation layer 70 within the antenna cavities C is completely removed, as shown in FIG. 11. However, the disclosure is not limited thereto. In some embodiments, some encapsulation residues may remain in the antenna cavities C, which will be described later. Thereafter, the photoresist layer PR2 is removed by a stripping process.

Figure 12:
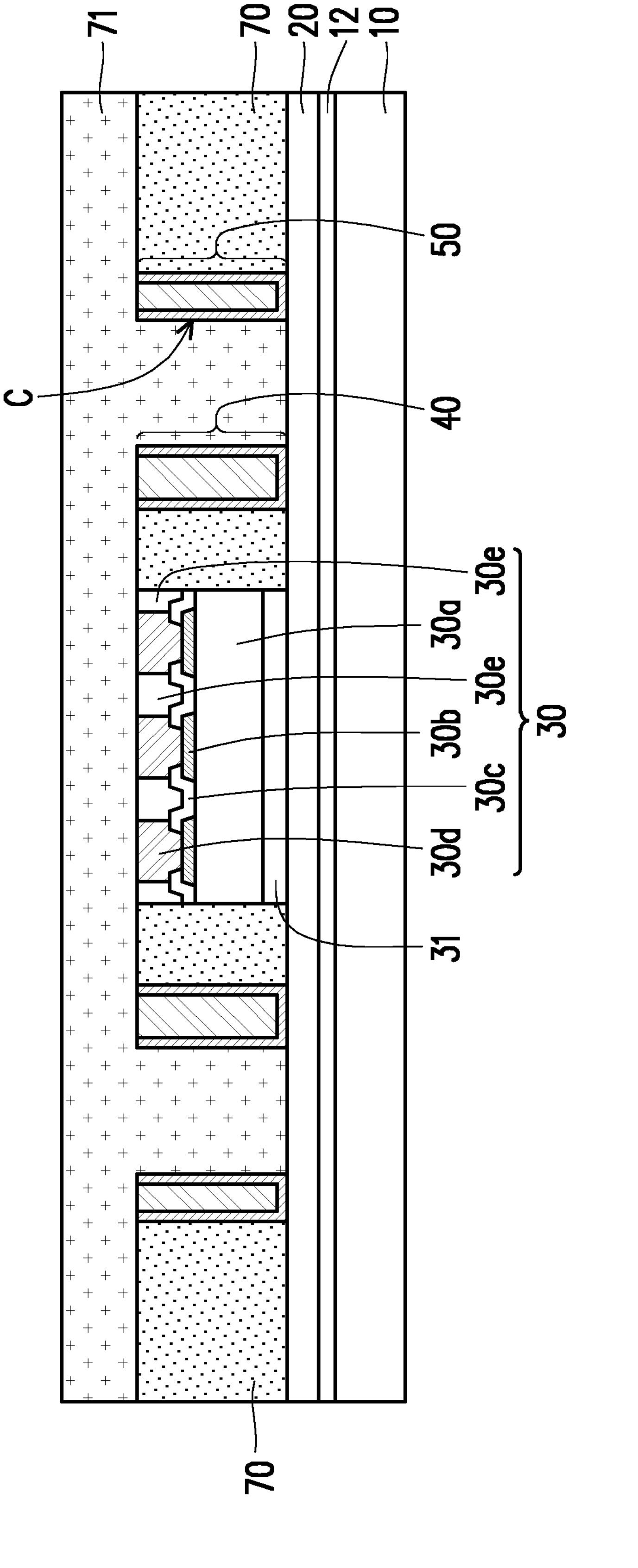

Referring to FIG. 12, a dielectric layer 71 is applied over the semiconductor die 30, the emitter structures 40, the ground structures 50 and the encapsulation layer 70, and fills in the antenna cavities C. In some embodiments, the dielectric layer 71 is in contact with the exposed portions of the buffer layer 20. In other embodiments, the dielectric layer 71 is not in contact with the exposed portions of the buffer layer 20.

In some embodiments, the dielectric layer 71 includes silicon oxide, silicon nitride, silicon oxynitride, metal oxide, metal nitride, metal silicate, transition metal oxide, transition metal nitride, transition metal silicate, oxynitride of metal, metal aluminate, zirconium silicate, zirconium aluminate, or the like.

In some embodiments, the dielectric constant of the dielectric layer 71 is greater than the dielectric constant of the encapsulation layer 70. For example, the dielectric layer 71 has a dielectric constant (k) greater than 3.0, greater than 3.5, greater than 10 or even higher.

In some embodiments, the dielectric layer 71 includes room-temperature (25° C.) liquid-phase high-k polymer having a dielectric constant greater than 3 (e.g., 3.1 to 3.5), such as PBO or PI, and such material is cured and hardened at low temperature less than 300° C. In this embodiments, there is no significant stress mismatch between the encapsulation layer 70 and the dielectric layer 71.

In some embodiments, the dielectric layer 71 includes room-temperature or low-temperature liquid-phase $SiO_2$ or SOG (spin on glass) having a dielectric constant of 3.9-4.2, and such material is cured and hardened at low temperature less than 300° C.

In some embodiments, the dielectric layer 71 includes liquid-phase silicon nitride having a dielectric constant of 6.9, and such material is cured and hardened at low temperature less than 250° C.

In some embodiments, the dielectric layer 71 includes low-temperature (e.g., 0-300° C. or 150-250° C.) CVD-$SiO_2$, $SiN_x$ or $SiO_xN_y$, and such material is deposited through APCVD, SACVD, microwave CVD, PECVD, MOCVD, etc.

In some embodiments, the dielectric layer 71 includes low-temperature (less than 300° C.) high-k metal oxide particulates with epoxy paste deposition or filling, and high-k particulates includes $ZrO_2$, $Al_2O_3$, $HfO_x$, $HfSiO_x$, $ZrTiO_x$, $TiO_2$, $TaO_x$, etc. Single type or mixed-type of high-k particulates may be adjusted upon the process requirements.

In some embodiments, the dielectric layer 71 includes other high-k dielectric films and their liquid-phase pastes, such $HfO_xN_y$, $ZrO_xN_y$, $HfSi_xO_y$, $ZrSi_xO_y$, $HfSi_xO_yN_z$, $ZrSi_xO_yN_z$, $TiO_2$, $Ta_2O_5$, $La_2O_3$, $CeO_2$, $Bi_4Si_2O_{12}$, $WO_3$, $Y_2O_3$, $LaAlO_3$, $Ba_{1-x}Sr_xTiO_3$, $PbTiO_3$, $BaTiO_3$ (BTO), $SrTiO_3$ (STO), $BaSrTiO_3$ (BST), $PbZrO_3$, lead-strontium-titanate (PST), lead-zinc-niobate (PZN), lead-zirconate-titanate (PZT), lead-magnesium-niobium (PMN), yttria-stabilized zirconia (YSZ), ZnO/Ag/ZnO (ZAZ), a combination thereof, or the like.

In some embodiments, the dielectric layer 71 is a single-layer structure. However, the disclosure is not limited thereto. In some embodiments, the dielectric layer 71 is a layered structure including at least two layers of different dielectric constants. In some embodiments, the dielectric layer 71 may be formed of a first sublayer with a dielectric constant greater than 10 (e.g., $TiO_2$) and a second sublayer with a dielectric constant less than 4.0 (e.g., PBO). In some embodiments, a sublayer of the dielectric layer 71 may include a material that is a same material as that used in the encapsulation layer 70.

Figure 13:
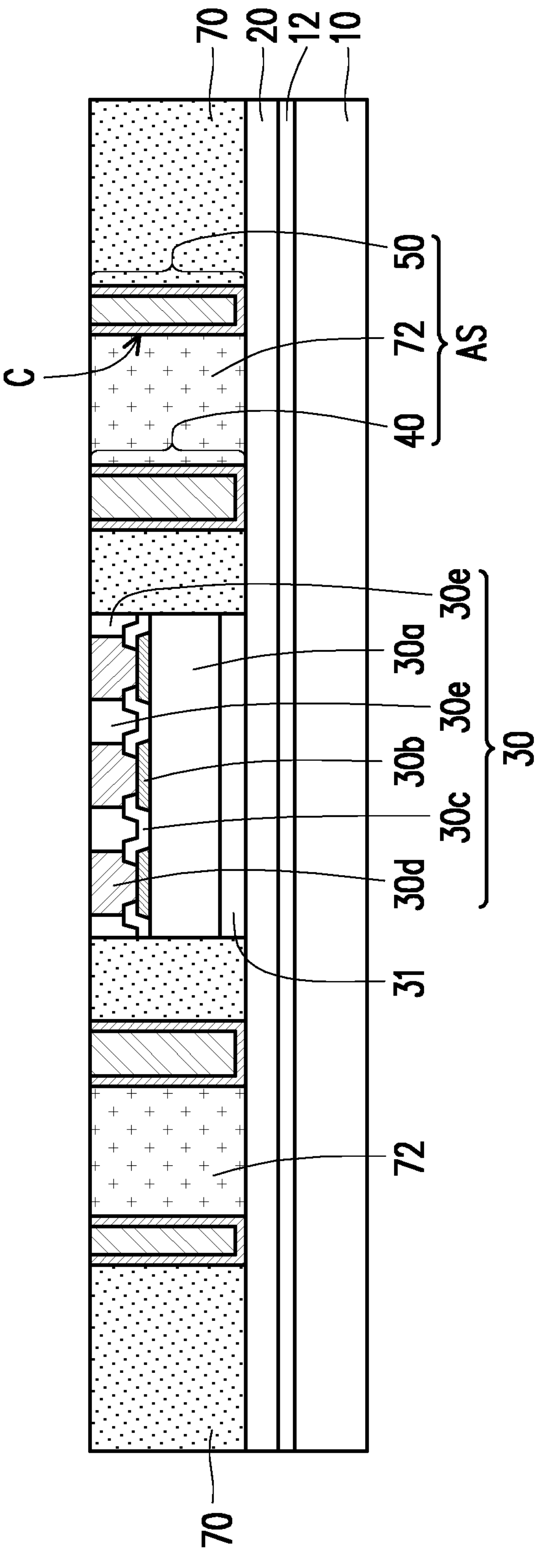

Referring to FIG. 13, a removing operation is performed to thin the dielectric layer 71 until the tops of the connectors 30*d*, the emitter structures 40 and the ground structures 50 are exposed. The removing operation can be accomplished by grinding (e.g., CMP), etching back, or scraper. The grinding leaves the top ends of the emitter structures 40 and the ground structures 50, to be substantially level or coplanar with the top surface of the remaining dielectric layer. Some metal residues such as metal particles may remain after the grinding operation. Accordingly, after the grinding operation, a cleaning may be performed, for example, through a wet etching, to remove the metal residues. The remaining dielectric layer forms multiple dielectric bulks 72, and one dielectric bulk 72 is provided between each emitter structure 40 and the adjacent ground structure 50. In some embodiments, multiple antenna structures AS are accordingly formed after the formation of the dielectric bulks 72, and each antenna structure AS includes one dielectric bulk 72 interposed between two adjacent emitter structure 40 and ground structure 50.

In some embodiments, a curing and hardening process is performed to the dielectric layer 71 before the removing operation with CMP in FIG. 13. However, the disclosure is not limited thereto. In other embodiments, a curing and hardening process is performed to the dielectric layer 71 after the removing operation with scraper in FIG. 13. In some embodiments, the curing and hardening process is performed at a temperature of 300° C. or less.

Existing antennas are usually disposed on a printed circuit board (PCB) with a large area for the emitter plane or the ground plane. As a result, the capacitance effect becomes more pronounced at high transmission frequencies, e.g., transmission frequencies in the range of tens of GHz. Such inevitable capacitance effect adversely impacts the antenna performance. Moreover, the existing antenna designs adopt a dielectric material of a relatively low dielectric constant as the insulating layer between the pair of conductive plates. The resulting antenna performance can achieve a return loss of about −10 dB. In contrast, the proposed dielectric layer 71 of a high-k dielectric material that is embedded in a molding compound of a package device causes generation of a greater electric field between the pair of the conductive plates. Moreover, the high-k material leads to a reduced capacitance effect and an improved return loss of −30 dB or better. In addition, the impedance matching circuit can be tuned more easily to achieve better transmission performance.

Referring to FIG. 14 to FIG. 18, a redistribution layer (RDL) structure 400 is formed over and electrically connected to the semiconductor die 30, the emitter structures 40 and the ground structures 50. The redistribution layer structure 400 is referred to as a "top-side or front-side redistribution layer structure" in some examples.

Figure 14:
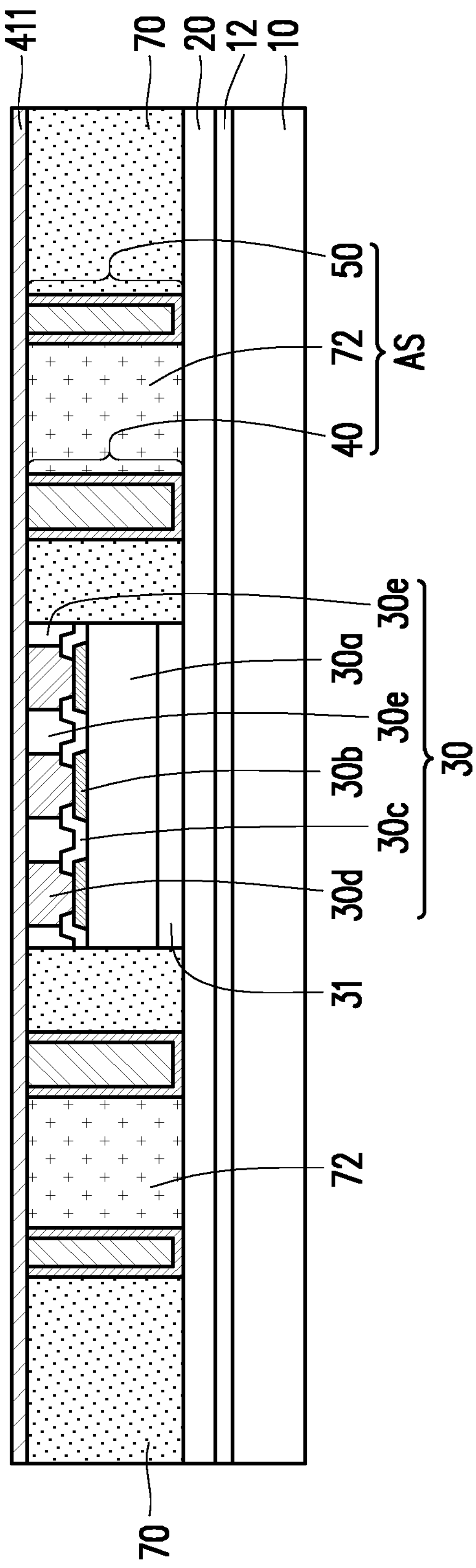
Figure 15:
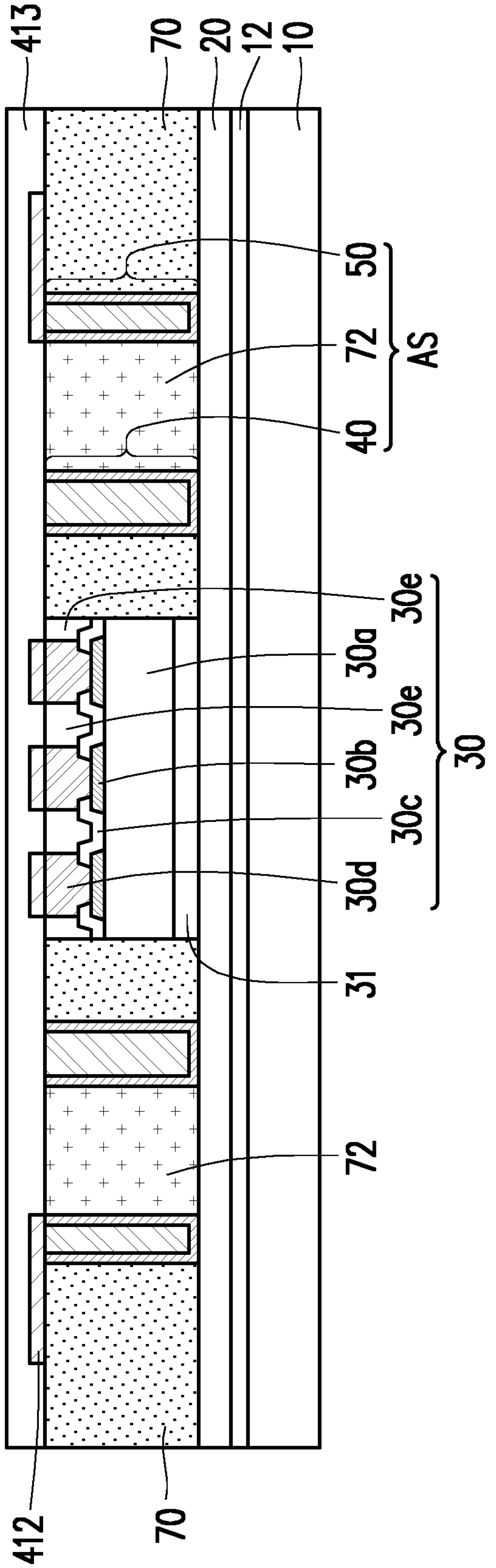

As shown in FIG. 14 to FIG. 15, a first-level conductive line 412 is formed. In some embodiments, a metal layer 411 (e.g. copper) is formed over the top surface of the structure of FIG. 13 by plating, which may be electro plating or electro-less plating. Next, the metal layer 411 is patterned and etched, leaving behind the first-level conductive line 412 over the ground structures 50 and the connectors 30*d* of the semiconductor die 30. Then, a dielectric layer 413 (e.g. PBO) is applied over the resulting structure. This structure is shown in FIG. 15.

Figure 16:
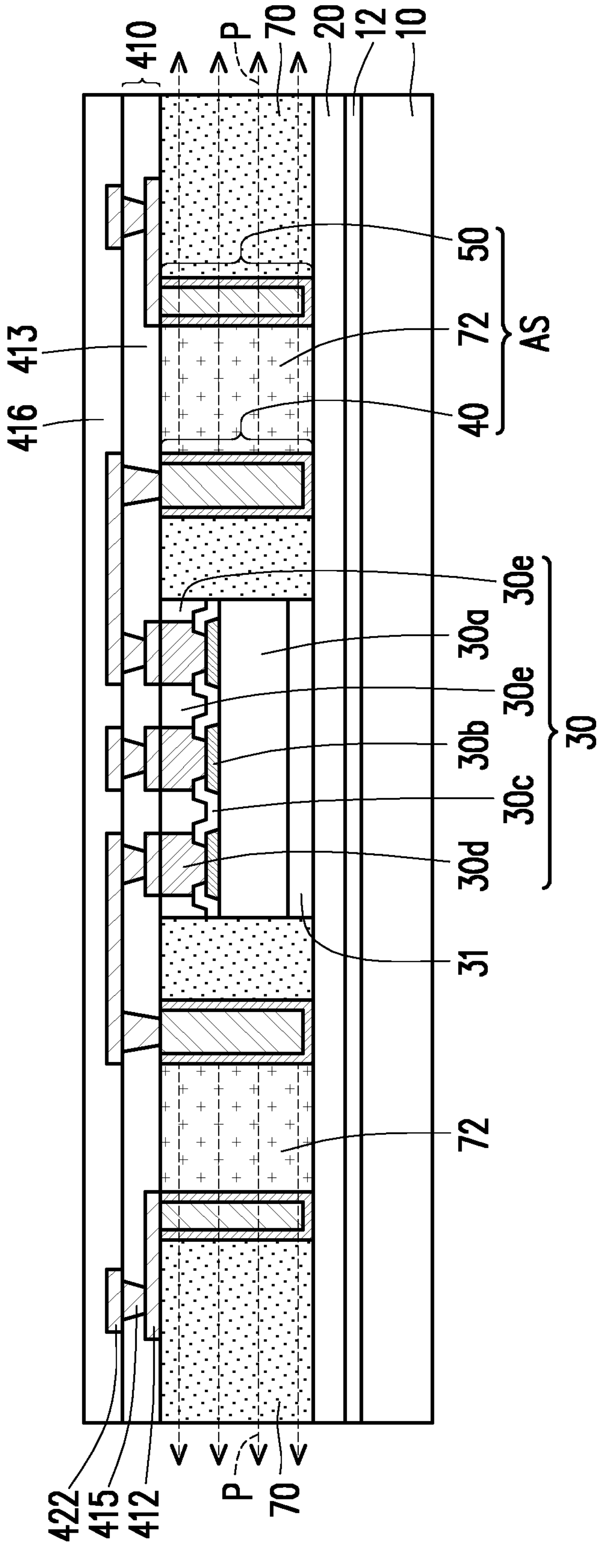

Referring to FIG. 16, the dielectric layer 413 is patterned to form via openings which are then filled with conductor metal (e.g. copper) to form the first-level conductive vias 415. The first-level redistribution layer 410 is thus completed.

Figure 17:
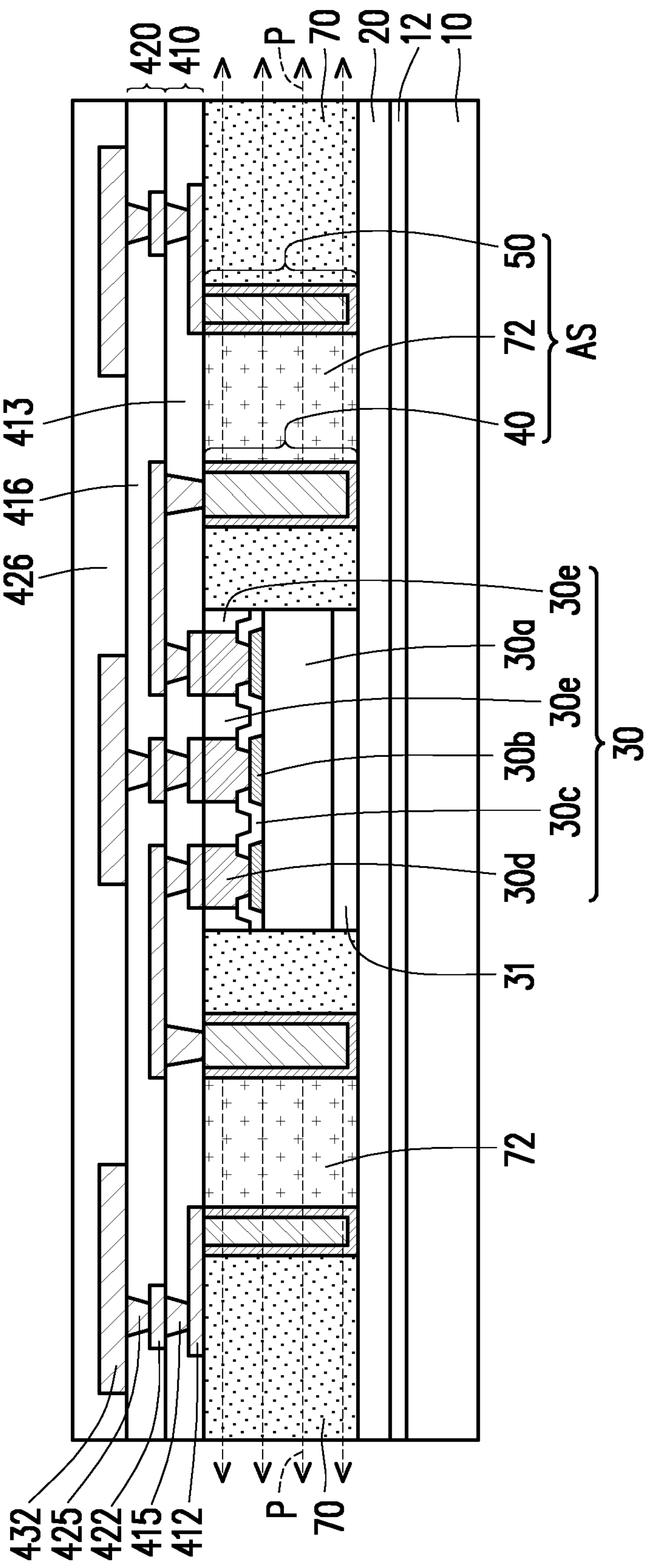

As shown in FIG. 16 to FIG. 17, a second-level redistribution layer 420 is formed on the first-level redistribution layer 410. In some embodiments, a layer of conductor metal (e.g. copper) is deposited over the first-level redistribution layer 410 then patterned and etched, leaving behind the second-level conductive line 422 over the first-level redistribution layer 410. A dielectric layer 416 (e.g. PBO) is then applied over the resulting structure. This structure is shown in FIG. 16.

Thereafter, as shown in FIG. 17, the dielectric layer 416 is patterned to form via openings which are then filled with conductor metal (e.g. copper) to form second-level conductive vias 425. The second-level redistribution layer 420 is thus completed.

Figure 18:
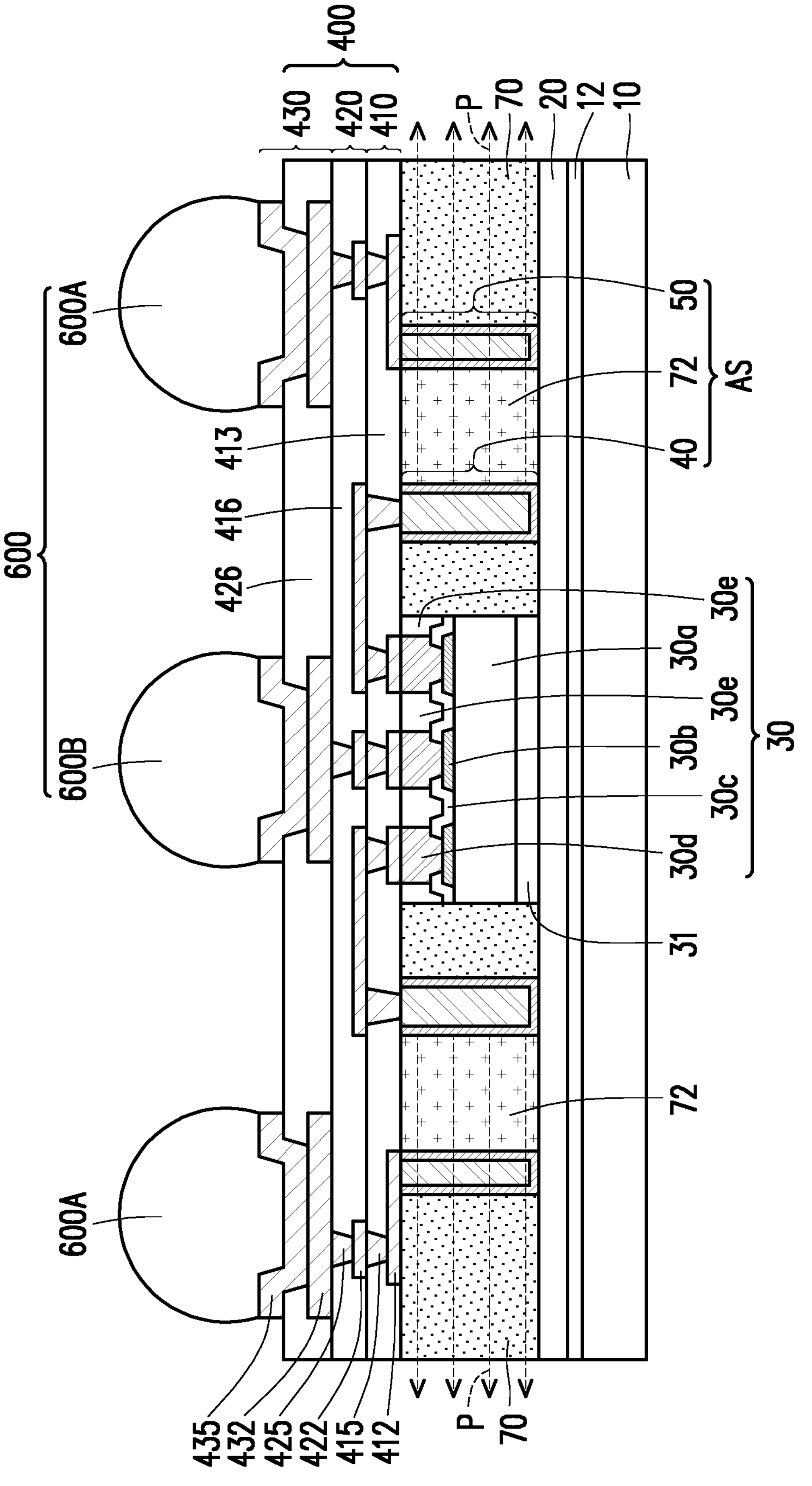

As shown in FIG. 17 and FIG. 18, a third-level redistribution layer 430 is formed on the second-level redistribution layer 420. In some embodiments, a layer of conductor metal (e.g. copper) is deposited over the second-level redistribution layer 420 then patterned and etched, leaving behind the third-level conductive line 432 over the second-level redistribution layer 420. A dielectric layer 426 (e.g. PBO) is then applied over the resulting structure. This structure is shown in FIG. 17.

Thereafter, as shown in FIG. 18, the dielectric layer 426 is patterned to form openings for under ball metal (UBM) pads which are then filled with conductor metal (e.g. copper) to form the UBM pads 435. The third-level redistribution layer 430 is thus completed. This structure is shown in FIG. 18.

Figure 19:
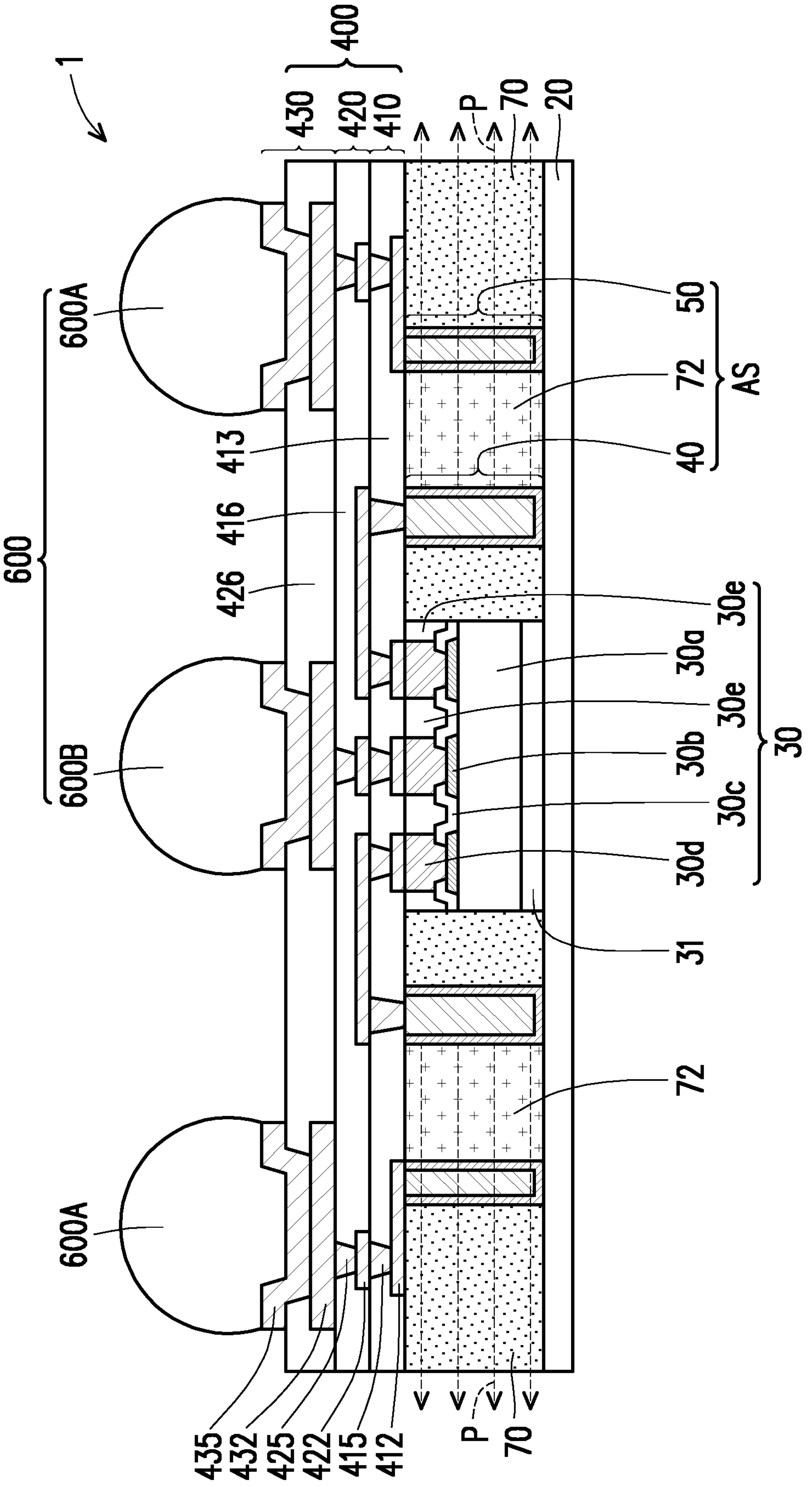

FIG. 19 further shows the formation of the next level electrical connectors in accordance with some embodiments. In this embodiment, the electrical connectors are bumps 600 attached to the exposed portions of the UBM pads 435. In some embodiments, the bumps 600 can be formed by placing solder balls on the UBM pads 435 and then reflowing the solder balls. In other embodiments, the formation of the bumps 600 includes performing a plating operation to form solder regions over the UBM pads 435, and then reflowing the solder regions. In other embodiments, the bumps 600 can be metal pillars, or metal pillars with solder caps, which may also be formed through plating. In some embodiments, the bumps 600 include bumps 600A electrically connected to the ground structures 50, and bumps 600B electrically connected to the emitter structures 40 and the semiconductor chip 30.

In some embodiments, the first-level conductive line 412, the first-level conductive vias 415, the second-level conductive line 422, the second-level conductive vias 425, the third-level conductive line 432, and the UBM pads 435 can include a metal or a metal alloy including Cu, Al, W, Ni, or an alloy thereof. In some embodiments, the above metal features are formed separately, so there is an interface between the two adjacent metal features. However, the disclosure is not limited thereto. In some embodiments, some adjacent metal features (e.g., 422 and 415, 425 and 422) are formed integrally without an interface therebetween.

In some embodiments, the dielectric layers 413, 416, and 426 include a polymer such as polyimide, benzocyclobutene (BCB), polybenzoxazole (PBO), or the like. Alternatively, the dielectric layers 413, 416, and 426 may include non-organic dielectric materials such as silicon oxide, silicon nitride, silicon carbide, silicon oxynitride, or the like. In the embodiments, In some embodiments, each of the dielectric layers has a dielectric constant (k) less than 3.5, such as from 2.8 to 3.0.

Referring to FIG. 19, the semiconductor package of FIG. 18 is debonded from the carrier 10. The debonding layer 12 is also cleaned from the semiconductor package. The resulting final semiconductor package 1 is shown in FIG. 19. The dotted arrows in FIG. 19 indicate the paths P for electromagnetic waves, which will be described later. In some embodiments, the buffer layer 20 acts as the final protective insulator for the finished semiconductor package 1. However, the disclosure is not limited thereto. In other embodiments, a board substrate (e.g., PCB) is formed below the semiconductor package 1 and electrically connected to the semiconductor die 30 with bumps penetrating through the back-side buffer layer 20.

In the above embodiments, upon the operation of forming antenna cavities C in FIG. 11, no encapsulation layer remains within the antenna cavities C, so the antenna cavities C are then all filled with the high-k dielectric bulk 72. However, the disclosure is not limited thereto. In other embodiments, upon the operation of forming antenna cavities C in FIG. 11, some encapsulation residues 70*a* remain within the antenna cavities C, so the dielectric bulk is formed within the antenna cavities C and over the encapsulation residues 70*a*, as shown in the semiconductor package 2 of FIG. 20. In some embodiments, the interface between the encapsulation residues 70*a* and the dielectric layer 72 is non-smooth and rough. Accordingly, in some embodiments, the antenna structure AS1 of the semiconductor package 2 includes an emitter structure 40, a ground structure 50, a dielectric bulk 72 between the emitter structure 40 and the ground structure 50, and encapsulation residues 70*a* between the dielectric bulk 72 and each of the emitter structure 40 and the ground structure 50. The encapsulation residues 70*a* are regarded as part of dielectric bulk 72 in some examples.

The above embodiments in which the dielectric layer 72 is a single-layer structure is provided for illustration purposes, and are not construed as limiting the present disclosure. In other embodiments, the dielectric layer 72 is a multi-layer structure, as shown in the semiconductor package 3 of FIG. 21. In some embodiments, the dielectric layer 72 includes two layers (e.g., 72*a* and 72*b*), three layers or more layers with different dielectric constants. In some embodiments, one of the two layers 72*a* and 72*b* has a dielectric constant less than 4, and the other of the two layers 72*a* and 72*b* has a dielectric constant greater than 10. In some embodiments, each of the two layers 72*a* and 72*b* has a dielectric constant greater than 10. Accordingly, in some embodiments, the antenna structure AS2 of the semiconductor package 3 includes an emitter structure 40, a ground structure 50, and two layers 72*a* and 72*b* between the emitter structure 40 and the ground structure 50. In some embodiments, encapsulation residues 70*a* are further included between the dielectric bulk 72 (including two layers 72*a* and 72*b*) and each of the emitter structure 40 and the ground structure 50.

FIGS. 22-26 illustrate various simplified top views of semiconductor packages in accordance with some embodiments. For simplicity and clarity of illustration, only few elements are shown in the top views of FIGS. 22-26, and these elements are not necessarily in the same plane.

Figure 22:
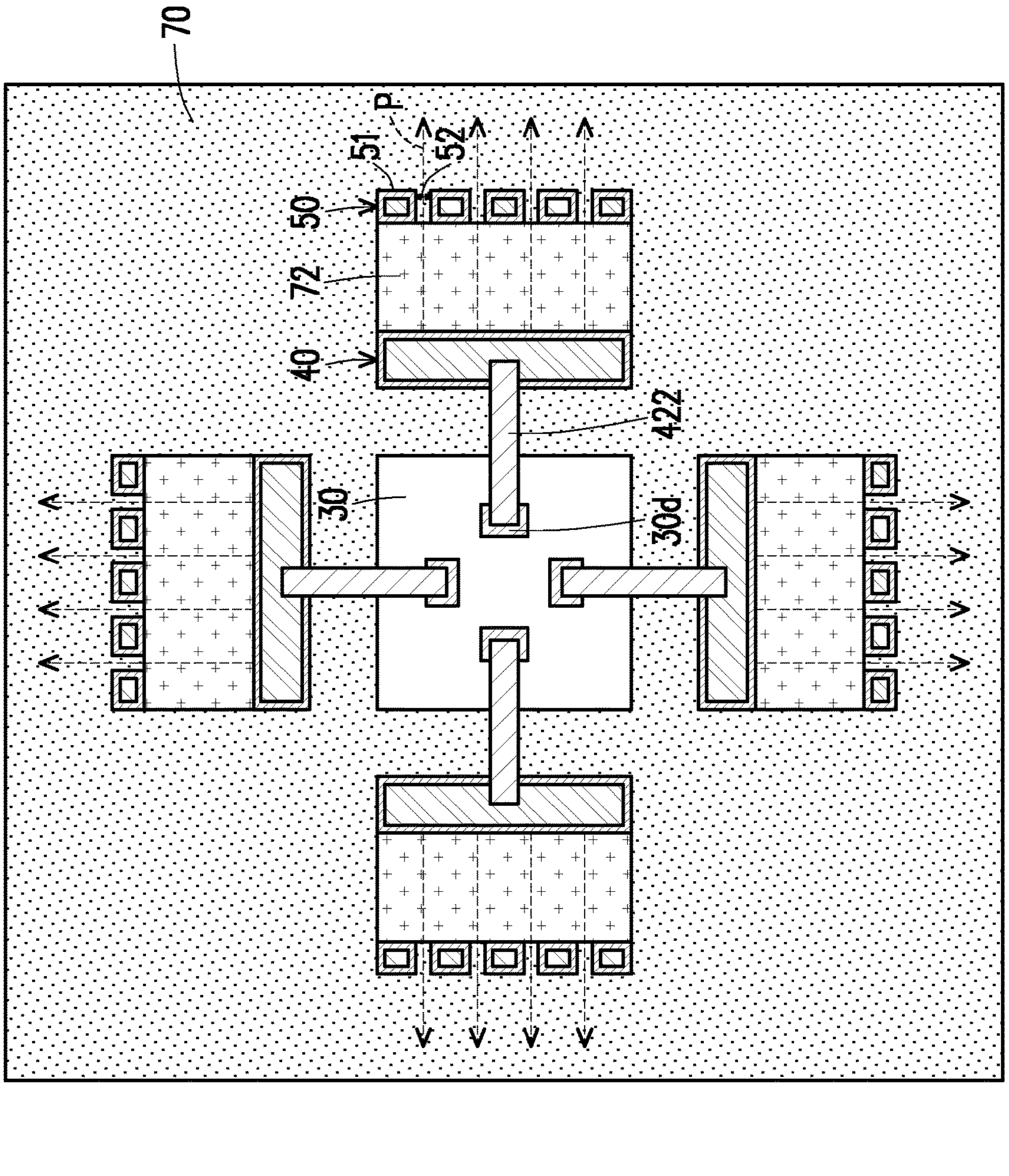
FIG. 22 to FIG. 26 illustrate schematic top views of semiconductor packages in accordance with some embodiments of the disclosure.

As shown in FIG. 22, there are four antenna structures at four sides of the semiconductor die 30. Specifically, an emitter structure 40 and a ground structure 50 are configured as a pair of plates of an antenna structure at one side of the semiconductor die 30, with a dielectric bulk 72 therebetween serving as the resonance cavity and insulator thereof. In some embodiments, the emitter structure 40 is shaped as a conductive wall substantially parallel to the sidewall of the semiconductor chip 30, and the ground structure 50 is shaped as multiple conductive pillars 51 with gaps 52 therebetween. In some embodiments, the width of the conductive pillars 51 or the gaps 52 is constant. However, the disclosure is not limited thereto. In other embodiments, the width of the conductive pillars 51 or the gaps 52 is varied upon the process requirements. The dielectric bulk 72 is referred to as an "antenna oscillation cavity" or "antenna resonance cavity" in some examples. As shown by the dotted arrows in FIG. 22, when the electromagnetic waves resonate within the resonance cavity, i.e., dielectric bulk 72, and radiate laterally along the paths P from the emitter structure 70 through gaps 51 of the ground structure 50. Similarly, three more antenna structures are arranged at other sides of the semiconductor die 30. Such configuration forms a four-branch antenna to provide enhanced radiation performance.

In the embodiment of FIG. 22, four antenna structures are provided at four sides of the semiconductor die 30. However, the disclosure is not limited by the disclosure. The number of the antenna structures may be adjusted upon the process requirements. In some embodiments, the number of the antenna structure(s) is $2^n$, and n is zero or a positive integer.

Figure 23:
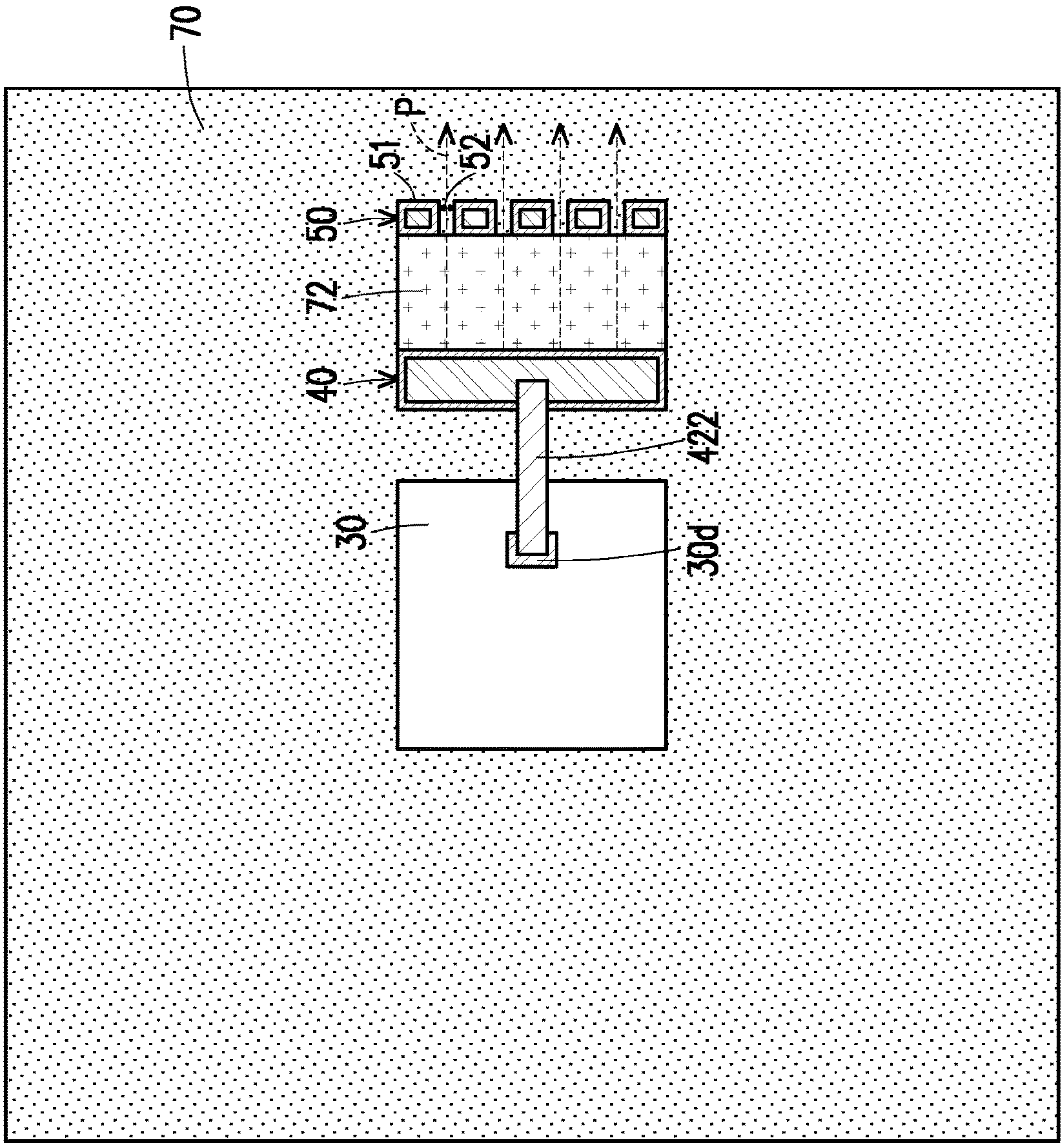

In some embodiments, as shown in FIG. 23, only one antenna structure is provided at one side of the semiconductor die 30.

Figure 24:
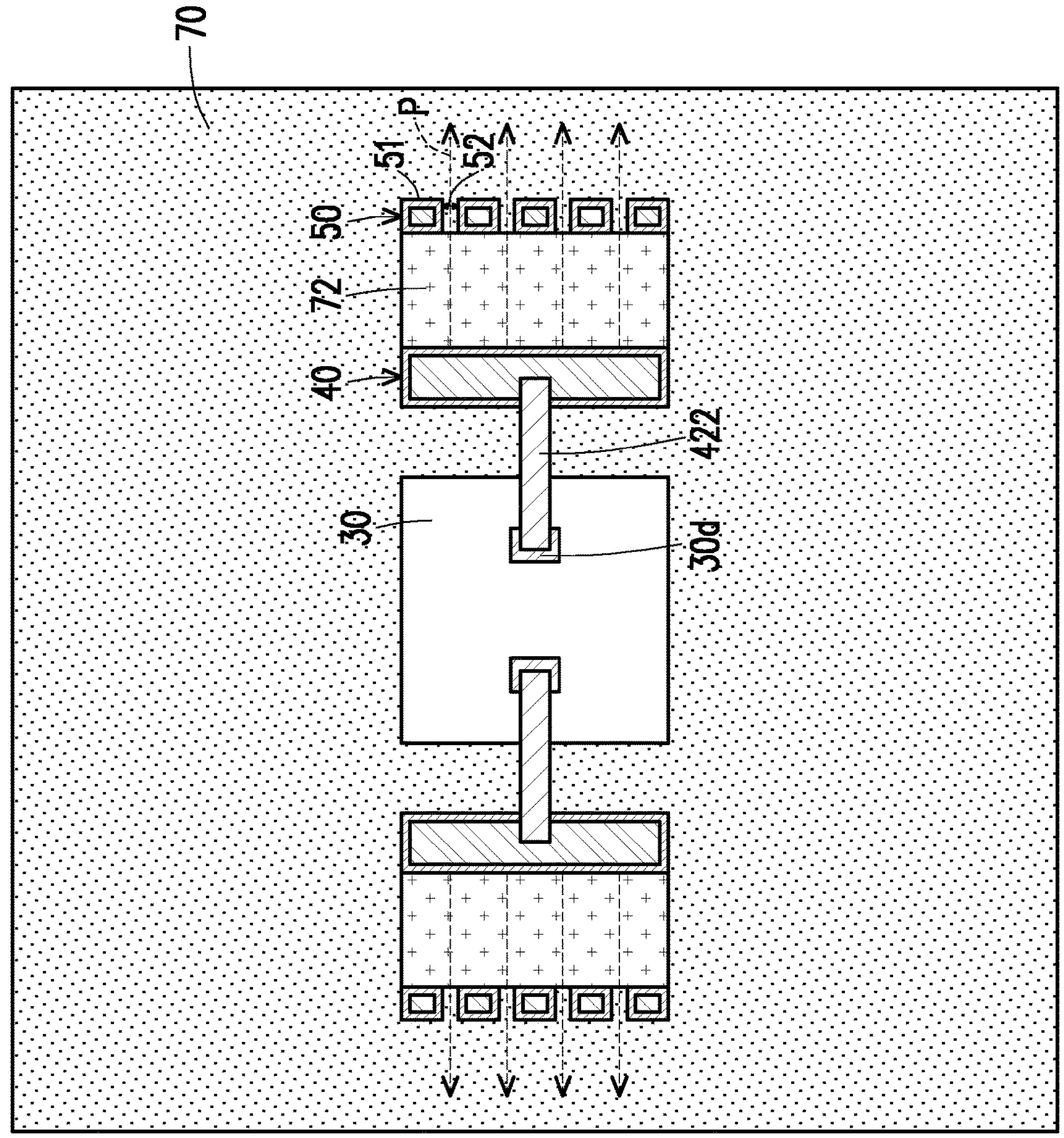

In some embodiments, as shown in FIG. 24, two antenna structures are provided at opposite sides of the semiconductor die 30. Such configuration forms a two-branch antenna to provide enhanced radiation performance.

Figure 25:
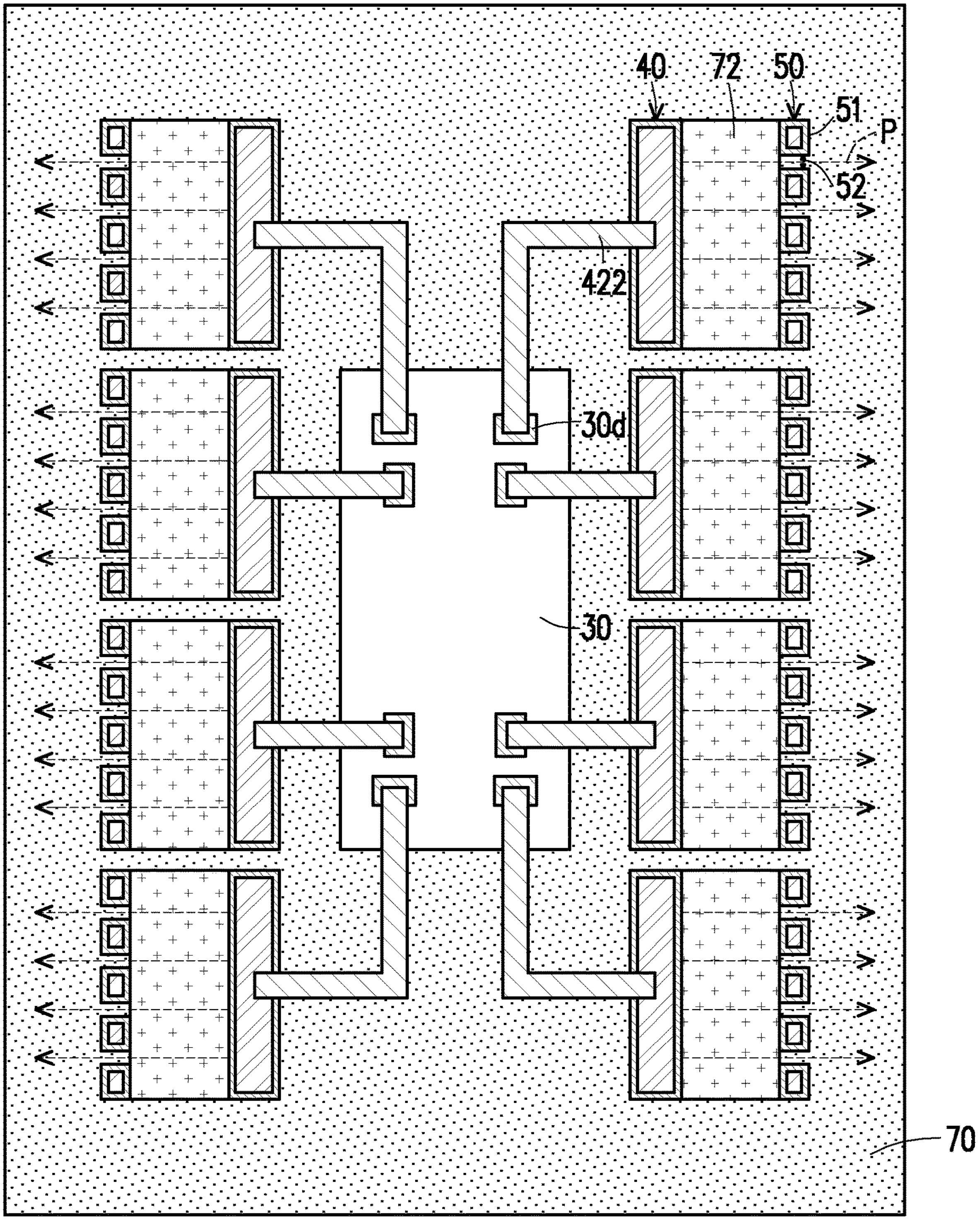
Figure 26:
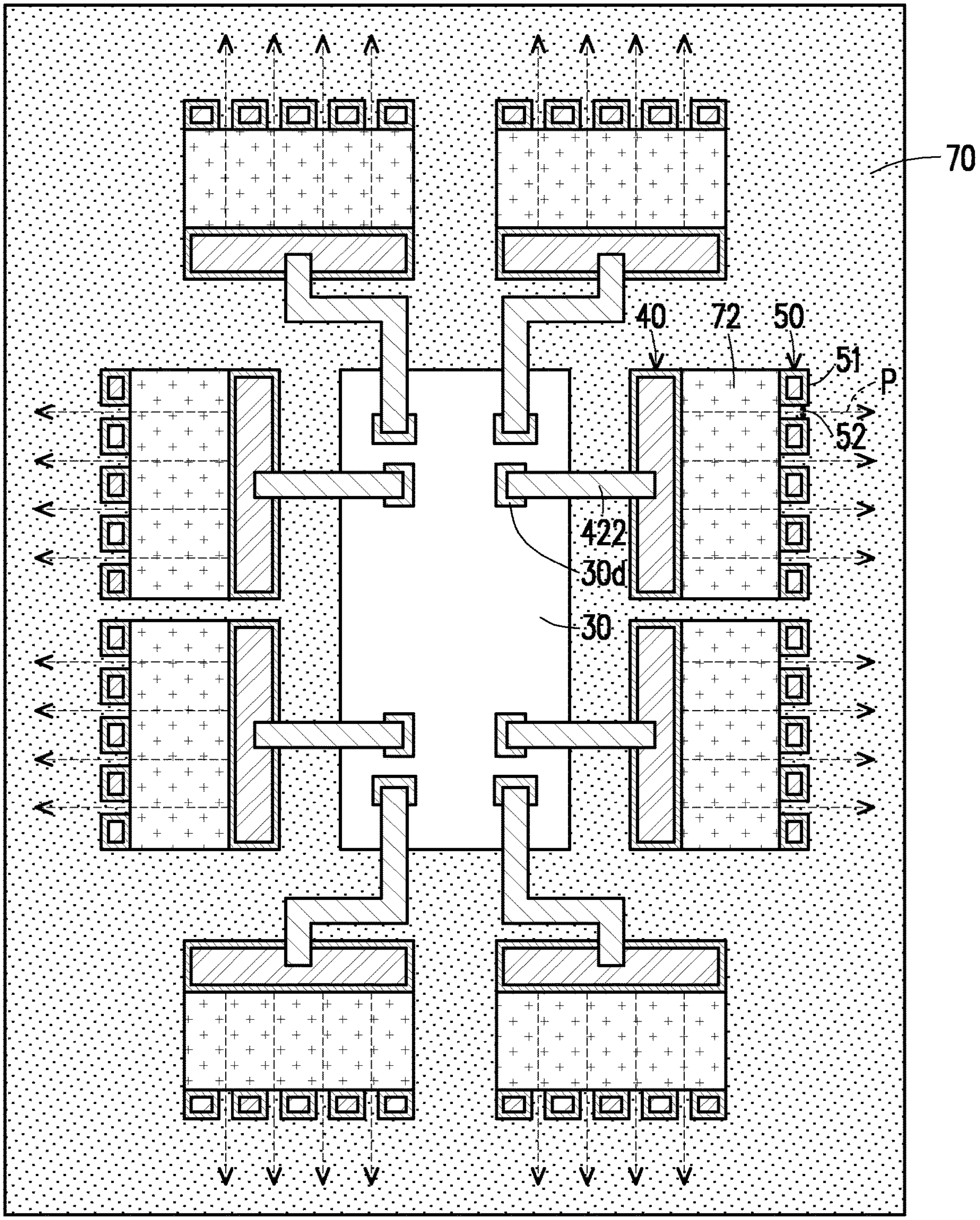

In some embodiments, as shown in FIG. 25, eight antenna structures are provided at four sides of the semiconductor die 30. In some embodiments, as shown in FIG. 26, eight antenna structures AS are provided at opposite sides of the semiconductor die 30. Such configuration forms an eight-branch antenna to provide enhanced radiation performance.

Figure 20:
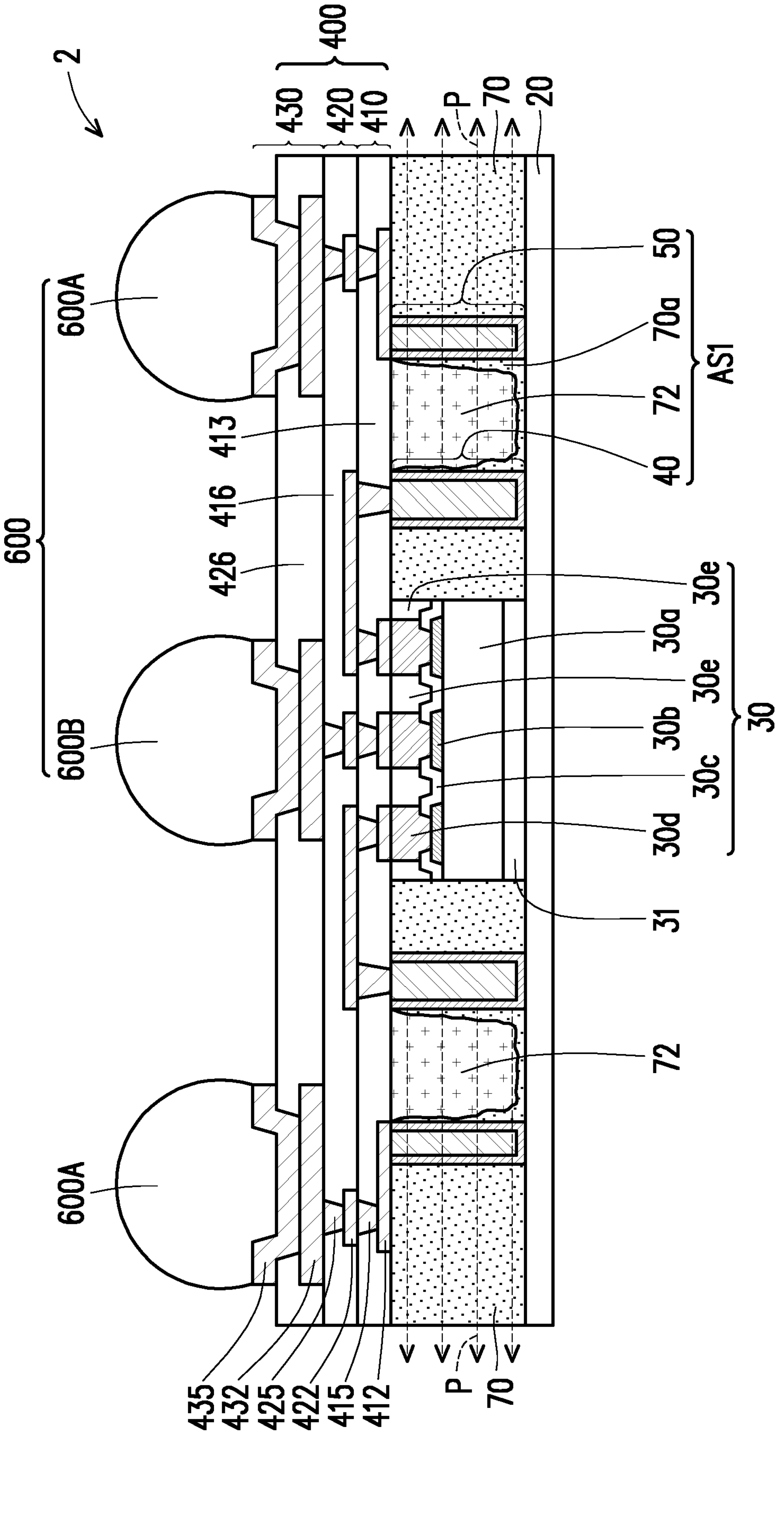
FIG. 20 to FIG. 21 illustrate schematic cross-sectional views of semiconductor packages in accordance with other embodiments of the disclosure.
Figure 21:
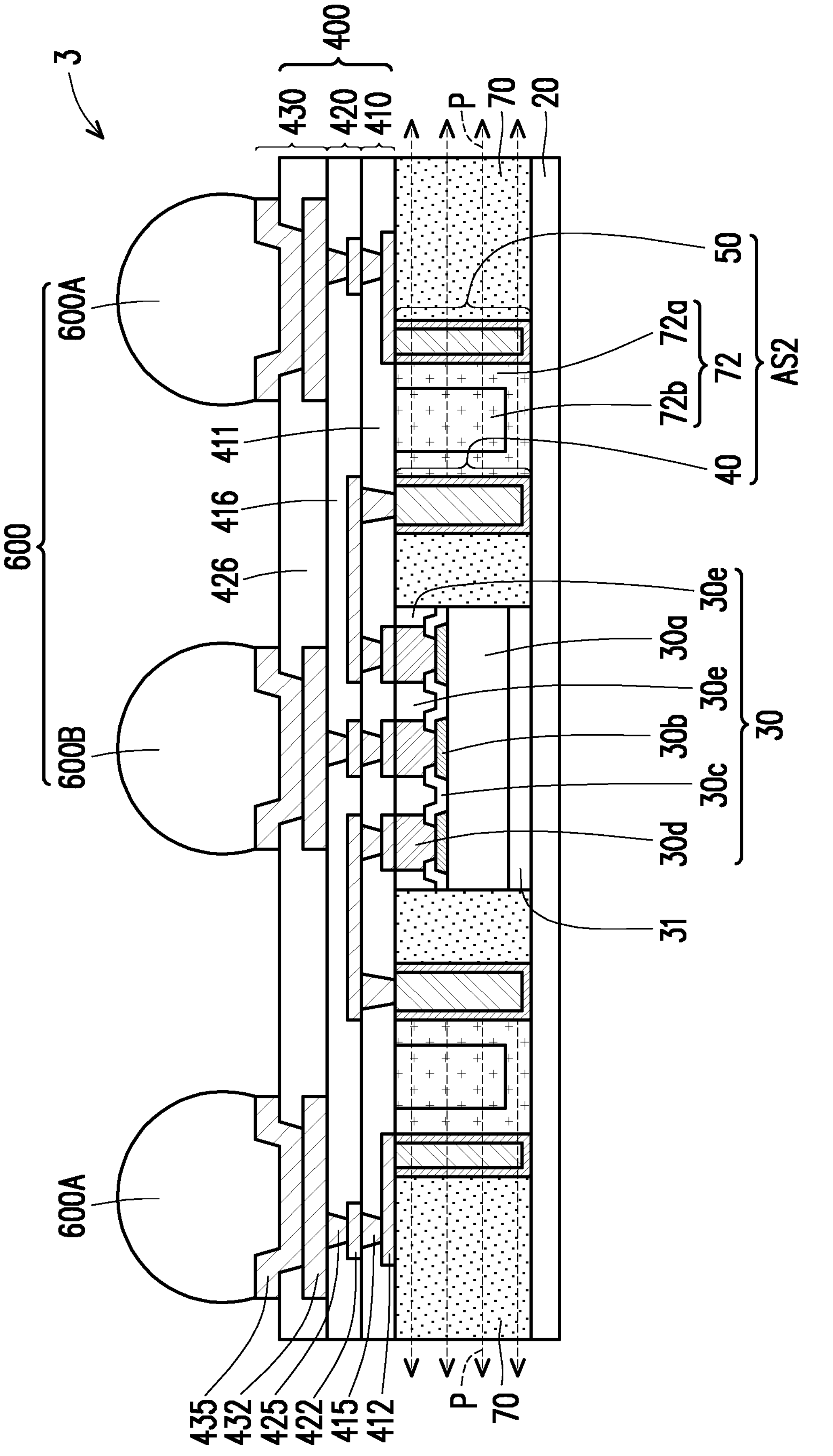

The structures of the disclosure are described below with reference to the cross-sectional views of FIGS. 19-21 and the top views of FIGS. 22-26.

In some embodiments, a semiconductor package 1/2/3 includes a semiconductor die 30, an encapsulation layer 70 and at least one antenna structure AS/AS1/AS2. The encapsulation layer 70 laterally encapsulates the semiconductor die 30. The at least one antenna structure AS/AS1/AS2 is embedded in the encapsulation layer 70 aside the semiconductor die 30. The at least one antenna structure AS/AS1/AS2 includes a dielectric bulk 72, and a dielectric constant of the dielectric bulk 72 is higher than a dielectric constant of the encapsulation layer 70.

In some embodiments, the at least one antenna structure AS/AS1/AS2 further includes an emitter structure 40 between the dielectric bulk 72 and the semiconductor die 30. In some embodiments, the emitter structure 40 is a single solid conductive wall.

In some embodiments, the at least one antenna structure AS/AS1/AS2 further includes a ground structure 50, and the dielectric bulk 72 is between the ground structure 50 and the semiconductor die 30. In some embodiments, the ground structure 50 includes a plurality of separate conductive segments.

In some embodiments, the semiconductor package 1/2/3 further includes a redistribution layer structure 400 disposed over the encapsulation layer 70 and electrically coupled to the semiconductor die 30 and the at least one antenna structure AS/AS1/AS2.

In some embodiments, a number of the at least one antenna structure AS/AS1/AS2 is $2^n$, and n is zero or a positive integer. Specifically, the number of the at least one antenna structure AS/AS1/AS2 is 1, 2, 4, 8, 16, 32 . . . , and the antenna structure(s) may be arranged at one side, two sides, three sides, or four sides around the semiconductor die 30.

In some embodiments, the at least one antenna structure AS1 further includes a material the same as a material of the encapsulation layer 70.

In some embodiments, a semiconductor package 1/2/3 includes a semiconductor die 30, an encapsulation layer 70, at least one antenna structure AS/AS1/AS2, a first bump 600A for grounding and a second bump 600B for signaling. The encapsulation layer 70 laterally encapsulates the semiconductor die 30. The at least one antenna structure AS/AS1/AS2 is embedded in the encapsulation layer 70 aside the semiconductor die 30. The at least one antenna structure AS/AS1/AS2 includes an emitter structure 40 and a ground structure 50 embedded in the encapsulation layer 70, and the emitter structure 40 is disposed between the ground structure 50 and the semiconductor die 30. The first bump 600A for grounding is disposed over the encapsulation layer 70 and electrically coupled to the ground structure 50. The second bump 600B for signaling is disposed over encapsulation layer 70 and electrically coupled to the semiconductor die 30 and the emitter structure 40.

In some embodiments, the emitter structure 40 is a plate-like conductive via. In some embodiments, the ground structure 50 includes a plurality of conductive pillars or stripe-like conductive vias.

In some embodiments, the semiconductor package 1/2/3 further includes a redistribution layer structure 400 disposed between the encapsulation layer 70 and each of the first and second bumps 600A and 600B.

In some embodiments, the at least one antenna structure AS/AS1/AS2 further includes a dielectric bulk 72 between the emitter structure 40 and the ground structure 50, wherein a material of the dielectric bulk 72 is different from a material of the encapsulation layer 70. In some embodiments, a dielectric constant of the dielectric bulk 72 is greater than a dielectric constant of the encapsulation layer 70. In some embodiments, the dielectric bulk 72 is a single-layer structure, as shown in FIGS. 19 and 20. In some embodiments, the dielectric bulk 72 is a multi-layer structure, as shown in FIG. 21.

Figure 27:
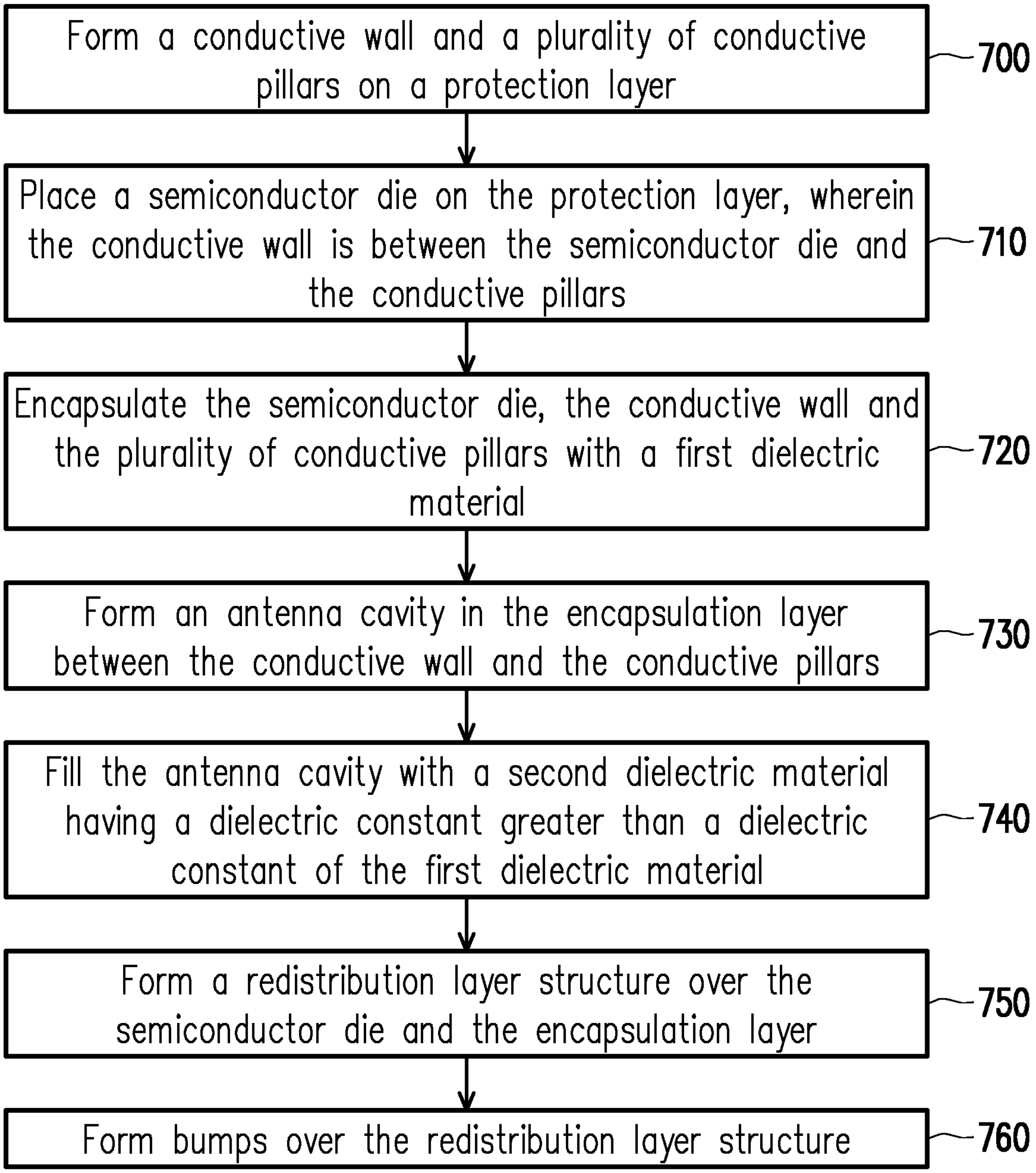
FIG. 27 illustrates a flow chart of a method of forming a semiconductor package in accordance with some embodiments of the disclosure.

FIG. 27 illustrates a flow chart of a method of forming a semiconductor package in accordance with some embodiments. Although the method is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 700, a conductive wall and a plurality of conductive pillars are formed on a protection layer. FIGS. 1-6 and FIGS. 22-26 illustrate varying views corresponding to some embodiments of act 700.

At act 710, a semiconductor die is placed on the protection layer, wherein the conductive wall is between the semiconductor die and the conductive pillars. FIG. 7 and FIGS. 22-26 illustrate varying views corresponding to some embodiments of act 710.

At act 720, the semiconductor die, the conductive wall and the plurality of conductive pillars are encapsulated with a first dielectric material. FIGS. 8-9 and FIGS. 22-26 illustrate varying views corresponding to some embodiments of act 720.

At act 730, an antenna cavity is formed in the encapsulation layer between the conductive wall and the conductive pillars. FIGS. 10-11 and FIGS. 22-26 illustrate varying views corresponding to some embodiments of act 730.

At act 740, the antenna cavity is filled with a second dielectric material having a dielectric constant greater than a dielectric constant of the first dielectric material. FIGS. 12-13 and FIGS. 22-26 illustrate varying views corresponding to some embodiments of act 740. In some embodiments, a method of filling the antenna cavity with the second dielectric material includes: forming a high-k paste over the first dielectric material, performing a curing and hardening process to the high-k paste, and performing a grinding process to expose tops of the conductive wall and the conductive pillars. In some embodiments, a method of filling the antenna cavity with the second dielectric material includes: forming a high-k paste over the first dielectric material, using a scraper to remove the high-k paste outside of the antenna cavity, and performing a curing and hardening process.

At act 750, a redistribution layer structure is formed over the semiconductor die and the encapsulation layer. FIGS. 14-19 and FIGS. 22-26 illustrate varying views corresponding to some embodiments of act 750.

At act 760, bumps are formed over the redistribution layer structure. FIG. 19 illustrates a view corresponding to some embodiments of act 760.

In view of the above, the antenna structure of the disclosure is embedded in the encapsulation layer, so the package size can be significantly reduced. Besides, the antenna structure of the disclosure includes a high-k dielectric bulk interposed between two adjacent emitter structure and ground structure, and the high-k dielectric bulk is beneficial to achieve better transmission and receiving performance. Moreover, the heights and/or widths of the emitter structure and the ground structure, and the distance between the emitter structure and the ground structure may be adjusted as needed, so as to increase the design flexibility of the antenna structure. In some embodiments, the antenna structure of the disclosure acts as a 5G high-frequency RF emission and receiving antenna structure.

In accordance with some embodiments of the disclosure, a semiconductor package includes a semiconductor die, an encapsulation layer and at least one antenna structure. The encapsulation layer laterally encapsulates the semiconductor die. The at least one antenna structure is embedded in the encapsulation layer aside the semiconductor die. The at least one antenna structure includes a dielectric bulk, and a dielectric constant of the dielectric bulk is higher than a dielectric constant of the encapsulation layer.

In accordance with other embodiments of the disclosure, a semiconductor package includes a semiconductor die, an encapsulation layer, at least one antenna structure, a first bump for grounding and a second bump for signaling. The encapsulation layer laterally encapsulates the semiconductor die. The at least one antenna structure is embedded in the encapsulation layer aside the semiconductor die. The at least one antenna structure includes an emitter structure and a ground structure embedded in the encapsulation layer, and the emitter structure is disposed between the ground structure and the semiconductor die. The first bump for grounding is disposed over the encapsulation layer and electrically coupled to the ground structure. The second bump for signaling is disposed over encapsulation layer and electrically coupled to the semiconductor die and the emitter structure.

In accordance with some embodiments of the disclosure, a method of forming a semiconductor package includes: forming a conductive wall and a plurality of conductive pillars on a protection layer; placing a semiconductor die on the protection layer, wherein the conductive wall is between the semiconductor die and the conductive pillars; encapsulating the semiconductor die, the conductive wall and the plurality of conductive pillars with a first dielectric material; forming an antenna cavity in the encapsulation layer between the conductive wall and the conductive pillars; and filling the antenna cavity with a second dielectric material having a dielectric constant greater than a dielectric constant of the first dielectric material.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure.

What is claimed is:

1. A semiconductor package, comprising:

a semiconductor die;

an encapsulation layer, laterally encapsulating the semiconductor die; and at least one antenna structure, embedded in the encapsulation layer aside the semiconductor die, wherein the at least one antenna structure comprises an emitter structure, a ground structure and a dielectric bulk disposed between the emitter structure and the ground structure, wherein a top surface of the emitter structure, a top surface of the ground structure and a top surface of the dielectric bulk are flushed with each other.

2. The semiconductor package of claim 1, wherein a dielectric constant of the dielectric bulk is higher than a dielectric constant of the encapsulation layer.

3. The semiconductor package of claim 1, wherein a top surface of the semiconductor die, a top surface of the encapsulation layer and a top surface of the at least one antenna structure are flushed with each other.

4. The semiconductor package of claim 1, wherein the emitter structure is a single solid conductive wall.

5. The semiconductor package of claim 1, wherein the ground structure comprises a plurality of separate conductive segments.

6. The semiconductor package of claim 1, further comprising a redistribution layer structure disposed over the encapsulation layer and electrically coupled to the semiconductor die and the at least one antenna structure.

7. The semiconductor package of claim 1, wherein a number of the at least one antenna structure is $2^n$, and n is zero or a positive integer.

8. The semiconductor package of claim 1, wherein the at least one antenna structure further comprises a material the same as a material of the encapsulation layer.

9. A semiconductor package, comprising:

a semiconductor die;

an encapsulation layer, laterally encapsulating the semiconductor die;

a plurality of antenna structures, embedded in the encapsulation layer aside the semiconductor die, wherein each of the plurality of antenna structure comprises an emitter structure and a ground structure embedded in the encapsulation layer, and the emitter structure is disposed between the ground structure and the semiconductor die, and wherein from a top view, at least two of the plurality of antenna structures are disposed at two opposite sides of the semiconductor die;

a first bump for grounding, disposed over the encapsulation layer and electrically coupled to the ground structure; and a second bump for signaling, disposed over encapsulation layer and electrically coupled to the semiconductor die and the emitter structure.

10. The semiconductor package of claim 9, wherein the emitter structure is a plate-like conductive via.

11. The semiconductor package of claim 9, wherein the ground structure comprises a plurality of stripe-like conductive vias.

12. The semiconductor package of claim 9, further comprising a redistribution layer structure disposed between the encapsulation layer and each of the first and second bumps.

13. The semiconductor package of claim 9, wherein the at least one antenna structure further comprises a dielectric bulk between the emitter structure and the ground structure, wherein the dielectric bulk comprises a high-k layer.

14. The semiconductor package of claim 13, wherein a dielectric constant of the high-k layer is greater than a dielectric constant of the encapsulation layer.

15. The semiconductor package of claim 13, wherein the dielectric bulk further comprises a dielectric layer between the high-layer and each of the emitter structure and the ground structure, and a dielectric constant of the dielectric layer is the same as a dielectric constant of the encapsulation layer.

16. The semiconductor package of claim 15, wherein an interface between the high-k layer and the dielectric layer is non-smooth and rough.

17. A method of forming a semiconductor package, comprising:

forming a conductive wall and a plurality of conductive pillars on a protection layer;

placing a semiconductor die on the protection layer, wherein the conductive wall is between the semiconductor die and the conductive pillars;

encapsulating the semiconductor die, the conductive wall and the plurality of conductive pillars with an encapsulation layer;

removing a portion of the encapsulation layer to form an antenna cavity in the encapsulation layer between the conductive wall and the conductive pillars;

forming a high-k paste over the encapsulation layer, wherein the high-k paste is filled into the antenna cavity; and removing the high-k paste outside of the antenna cavity, so as to form an antenna structure embedded in the encapsulation layer.

18. The method of claim 17, further comprising performing a curing and hardening process to the high-k paste.

19. The method of claim 17, further comprising:

forming a redistribution layer structure over the semiconductor die and the encapsulation layer; and forming bumps over the redistribution layer structure.

20. The method of claim 17, wherein a top surface of the semiconductor die, a top surface of the encapsulation layer and a top surface of the antenna structure are flushed with each other.

* * * * *